United States Patent
Iwagawa et al.

(10) Patent No.: US 6,905,181 B2
(45) Date of Patent: Jun. 14, 2005

(54) ELECTRIC PARKING BRAKE SYSTEM

(75) Inventors: Yoshihiro Iwagawa, Saitama (JP); Jun Miyakawa, Saitama (JP); Makoto Taniguchi, Saitama (JP); Yutaka Kichima, Saitama (JP); Katsuyuki Takei, Saitama (JP); Makoto Bessho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/691,439

(22) Filed: Oct. 22, 2003

(65) Prior Publication Data

US 2004/0113489 A1 Jun. 17, 2004

(30) Foreign Application Priority Data

Oct. 22, 2002 (JP) ..................................... P. 2002-307110
Oct. 22, 2002 (JP) ..................................... P. 2002-307113

(51) Int. Cl.⁷ ................................................. B60T 8/60
(52) U.S. Cl. ....................... 303/155; 188/2 D; 188/162; 303/20; 701/76
(58) Field of Search ............................. 303/3, 20, 191, 303/115.2, 122.03–122.07, 155, 162; 180/271; 477/186; 188/156–165, 265, 2 D; 701/76, 70–71, 80, 92; 792/219.4

(56) References Cited

U.S. PATENT DOCUMENTS

| | | | | |
|---|---|---|---|---|
| 4,561,527 A | * | 12/1985 | Nakamoto et al. | 192/219.4 |
| 5,139,315 A | * | 8/1992 | Walenty et al. | 303/162 |
| 6,158,822 A | * | 12/2000 | Shirai et al. | 303/3 |
| 6,406,102 B1 | * | 6/2002 | Arnold | 303/20 |
| 2004/0016612 A1 | * | 1/2004 | Iwagawa et al. | 188/265 |
| 2004/0113489 A1 | * | 6/2004 | Iwagawa et al. | 303/155 |

FOREIGN PATENT DOCUMENTS

JP          59-140152          8/1984

* cited by examiner

Primary Examiner—Douglas C. Butler
(74) Attorney, Agent, or Firm—Carrier, Blackman & Associates, P.C.; Joseph P. Carrier; William D. Blackman

(57) ABSTRACT

An electric parking brake system that includes a parking brake, and an electric motor, wherein the parking brake is activated by the electric motor. Operation of the parking brake is controlled such that a vehicle is decelerated at a target deceleration of a predetermined magnitude when an operation command to operate the parking brake is issued by a driver via an operation switch while the vehicle is running. If a service brake fails while a vehicle is running, when the driver depresses the operation switch to issue the operation command to a parking brake to brake the vehicle, the parking brake is controlled such that the vehicle is decelerated at the target deceleration of the predetermined magnitude set on the basis of the number of times of depressing the operation switch.

2 Claims, 29 Drawing Sheets

ELECTRIC PARKING BRAKE SYSTEM

BACKGROUND OF THE INVENTION

1. Field of the Invention

The present invention relates to an electric parking brake system in which a parking brake is operated by an electric motor.

Further, the present invention also relates to an electric parking brake system for operating and releasing parking brakes provided on left and right rear wheels by an electric motor.

2. Discussion of Background Art

Electric parking brake systems are known in which an electric motor is driven to operate or release a parking brake when the operation of an associated switch is detected or the stop of a vehicle is detected, and the electric parking brake systems of this kind are sometimes used as a back-up system in case a service brake which is operated by a brake pedal fails (for example, refer to the following patent literature).

[Patent Literature]

JP-B-4-28576

Incidentally, while the brake force of a general electric parking brake system is controlled based on the current value of an electric motor and the amount of stroke of a cable which operates a parking brake, a brake force actually obtained varies depending on the conditions of a friction material (for example, the temperature and degree of wear of the friction material) when the parking brake is applied even if the current value and the stroke amount are controlled to remain the same. Consequently, there is caused a problem that a deceleration (a braking force) of the vehicle obtained when the driver operates the operating member such as a manual operation command switch to operate electric parking brakes while the vehicle is running varies from time to time, and moreover, there is also caused a problem that unlike the service brakes, the driver cannot adjust the magnitude of braking force of the electric parking brakes arbitrarily.

Further, in the event that the electric parking brake system is actuated when the vehicle is running on a road surface having a low friction coefficient, when the braking force increases excessively relative to the road surface friction coefficient, there is caused a possibility that the wheels are locked, and, in particular, when the rear wheels are locked, there may be caused a risk that the stability in behaviors of the vehicle is deteriorated. On the other hand, when attempting to use the parking brake system as a back-up system for the service brake, a certain magnitude of braking force is required, and when attempting to meet the requirement, the braking force tends to increase excessively, whereby there is caused a problem that the rear wheels are easily locked.

To cope with the problem, while it is considered that the upper limit value of the braking force of the electric parking brake system is restricted based on the current value of an electric motor and the stroke amount of a cable used to operate the parking brake, even if the current value and the stroke amount are controlled to remain the same, a braking force that is actually obtained varies depending on the conditions of a friction material when the brake is applied (for example, the temperature and degree of wear of the friction material), and therefore, it is difficult to accurately regulate the upper limit of the braking force of the electric parking brake system.

Further, the invention is made in view of the situations, and an object thereof is to prevent the locking of the rear wheels in an ensured fashion without being affected by the conditions of the friction materials when the brakes are applied to the rear wheels of a running vehicle by the electric parking brake system.

SUMMARY OF THE INVENTION

The invention is made in view of the situations, and an object thereof is to enable the obtainment of a desired deceleration without being affected by the conditions of the friction materials when attempting to brake the running vehicle using the electric parking brake system.

With a view to attaining the object, according to a first aspect of the invention, there is proposed an electric parking brake system in which a parking brake is operated by an electric motor, being characterized in that the operation of the parking brake is controlled such that a vehicle is decelerated at a target deceleration of a predetermined magnitude when an operation command to operate the parking brake is issued by a driver while the vehicle is running.

According to the construction, since the braking force of the parking brake is controlled such that the vehicle is decelerated at the target deceleration of the predetermined magnitude when the driver attempts to brake the running vehicle by issuing the operation command to operate the parking brake, even in case the temperature and degree of wear of the friction material of the parking brake vary, the vehicle can be decelerated at the target deceleration at all times, thereby making it possible to obtain a stable brake effect that is free from being affected by the conditions of the friction material.

According to a second aspect of the invention, there is proposed an electric parking brake system as set forth in the first aspect of the invention, wherein the operation command is issued based on the operation of an operating member by the driver, and wherein the magnitude of the target deceleration is set based on an amount of operation of the operating member.

According to the construction, since the operation command of the parking brake is issued based on the operation of the operating member by the driver, the braking that matches the intention of the driver can be attained. In addition, since the magnitude of the target deceleration can be set based on the amount of operation of the operating member, the generation of a deceleration demanded by the driver can be ensured.

According to a third aspect of the invention, there is proposed an electric parking brake system as set forth in the second aspect of the invention, wherein the operating member comprises a switch which changes over from a non-command position to an operation command position when depressed by the driver and which is held at the operation command position only while kept depressed by the driver, wherein the number of changeovers from the non-command position to the operation command position constitutes the amount of operation, and wherein, when the switch continues to be situated at the operation command position even after a vehicle body deceleration increases to the target deceleration, the target deceleration is increased.

According to the construction, since, when the switch constituting the operating member is operated to change over from the non-command position to the operation command position, the magnitude of the target deceleration is set according to the number of changeovers of the switch, and when the switch continues to be held at the operation command position after the vehicle body deceleration is increased to the target deceleration, the target deceleration is increased, the magnitude of vehicle body deceleration can arbitrarily be controlled as the driver intends.

Note that a manual operation command switch 23*b* of an embodiment corresponds to the operating member or the switch of the invention.

Further, with a view to attaining the object, according to still another aspect of the invention, there is proposed an electric parking brake system in which a parking brake is activated by an electric motor, being characterized in that an upper limit value for a vehicle body deceleration is set in advance, whereby the operation of the parking brake is controlled such that the vehicle body deceleration does not exceed the upper limit value so set when an operation command to operate the parking brake is issued by a driver while the vehicle is running.

According to the construction, in attempting to brake the running vehicle by issuing an operation command to actuate the parking brake by the driver, since the operation of the parking brake can be controlled such that the vehicle body deceleration does not exceed the upper limit value set in advance, locking of the rear wheel can be prevented by accurately regulating a maximum value for the vehicle body deceleration to a predetermined magnitude irrespective of the temperature and degree of wear of the friction material of the parking brake.

DETAILED DESCRIPTION OF THE PREFERRED EMBODIMENTS

A mode for carrying out the invention will be described below based on an embodiment of the invention illustrated in the accompanying drawings.

Figure 1:
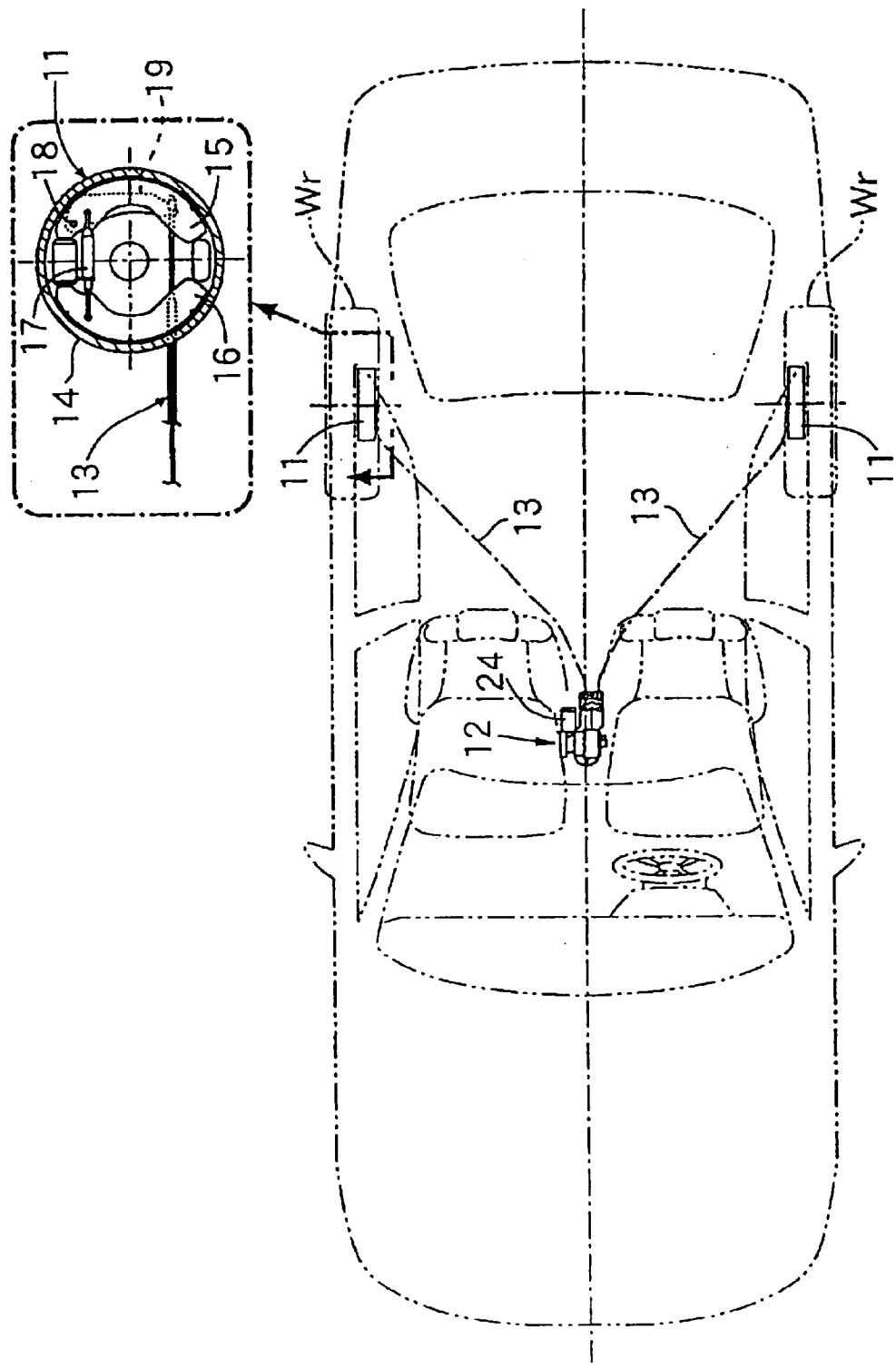
FIG. 1 is a plan view of a vehicle on which an electric parking brake system is installed.
Figure 2:
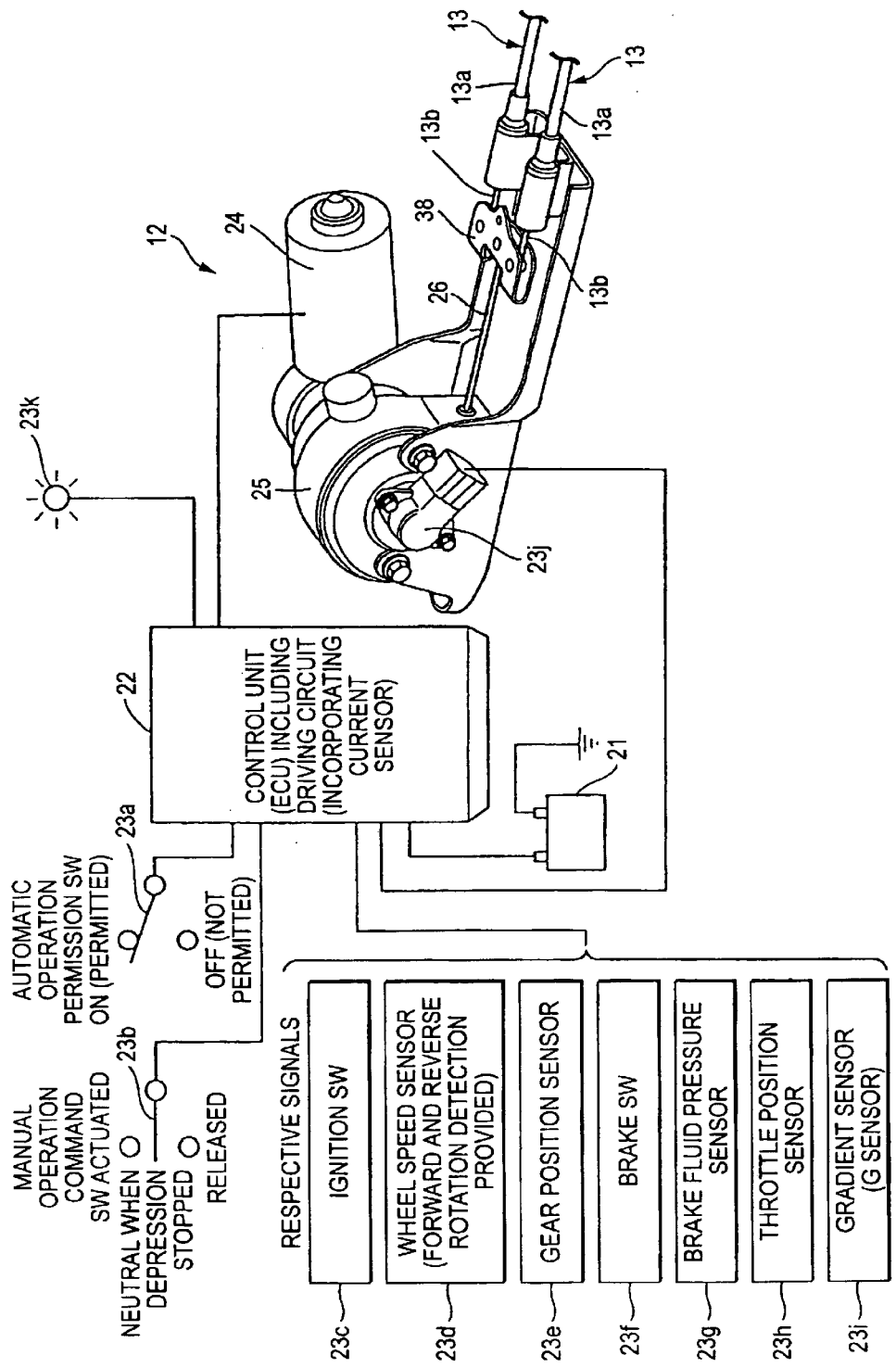
FIG. 2 is an explanatory diagram of a control system of the electric parking brake system.
Figure 3:
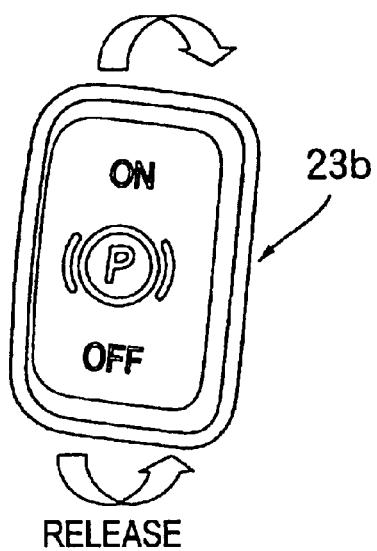
FIG. 3 is a drawing illustrating the configuration of a manual operation command switch.
Figure 4:
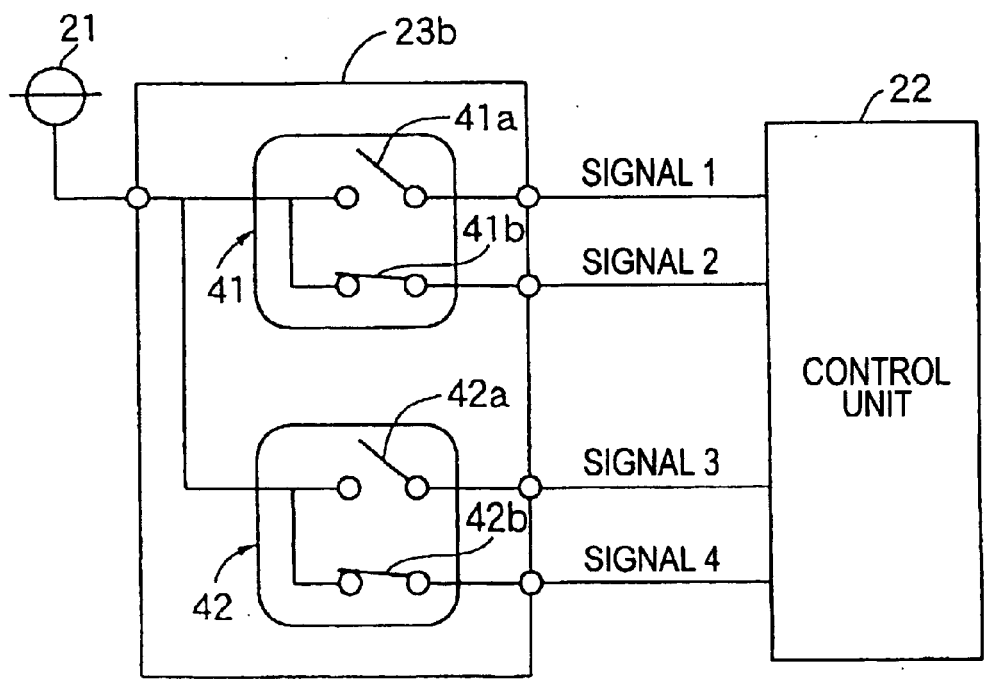
FIG. 4 is a circuit diagram of the manual operation command switch.
Figure 5:
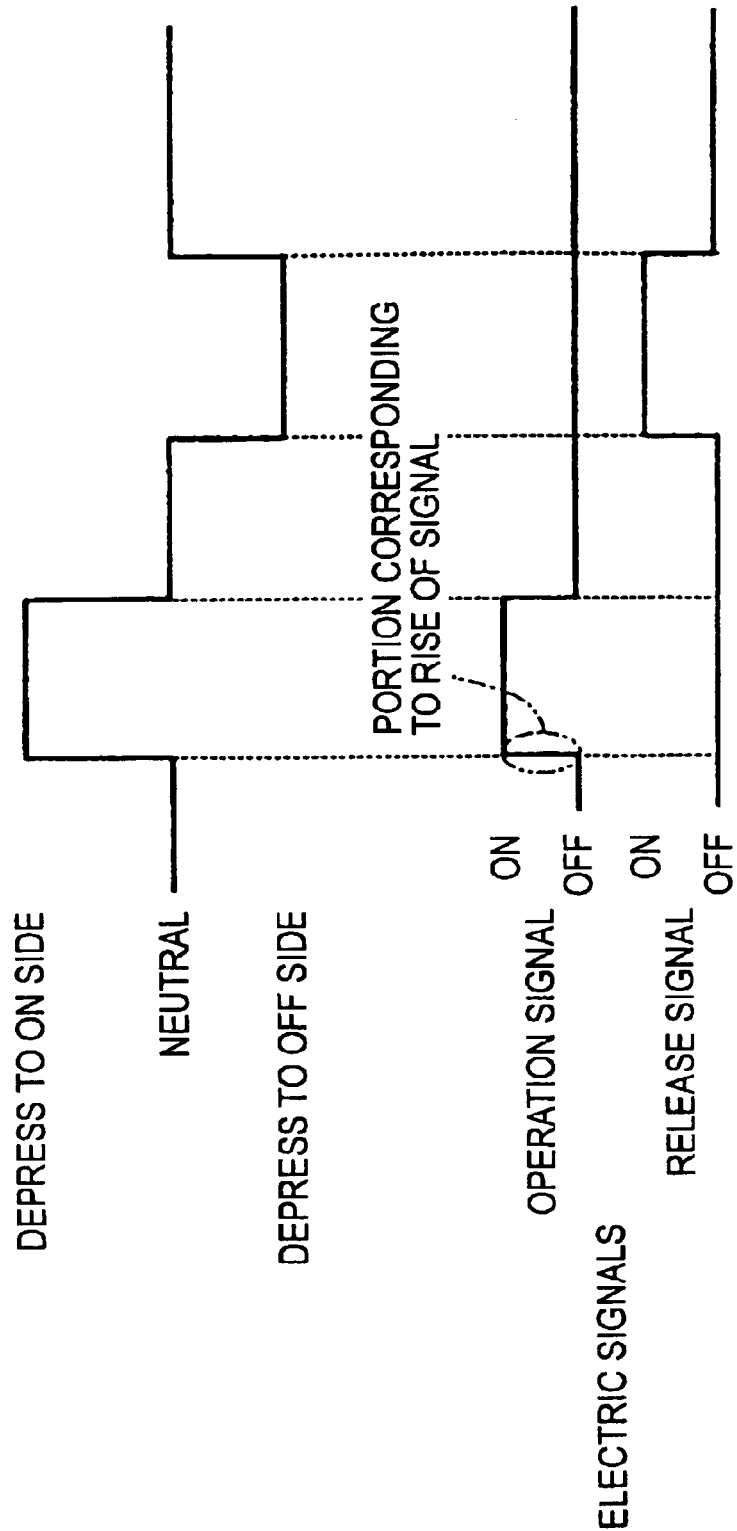
FIG. 5 is an explanatory diagram explaining the operation of the manual operation command switch and output signals.
Figure 6:
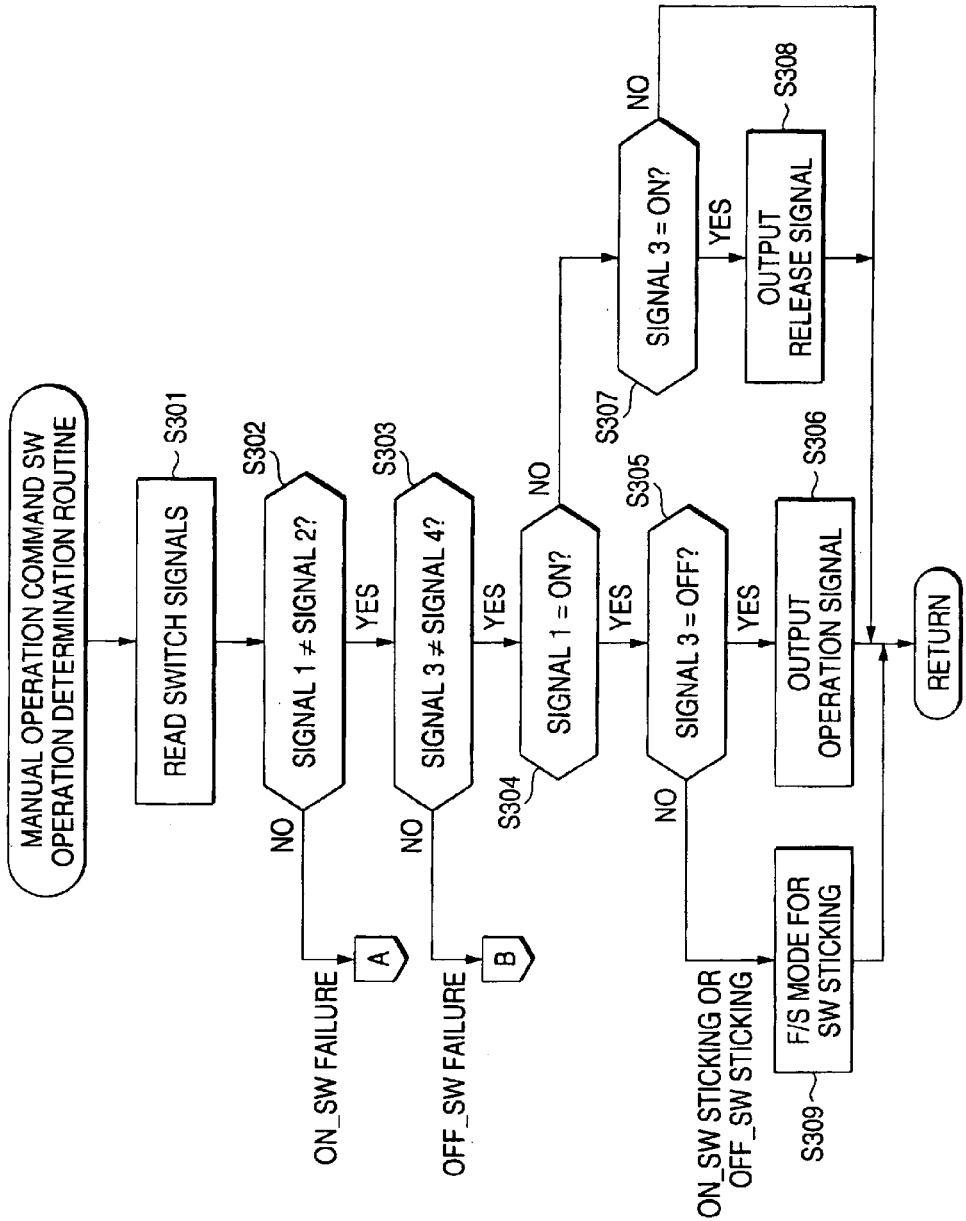
FIG. 6 is a first part of a flowchart illustrating a manual operation switch operation determination routine.
Figure 7:
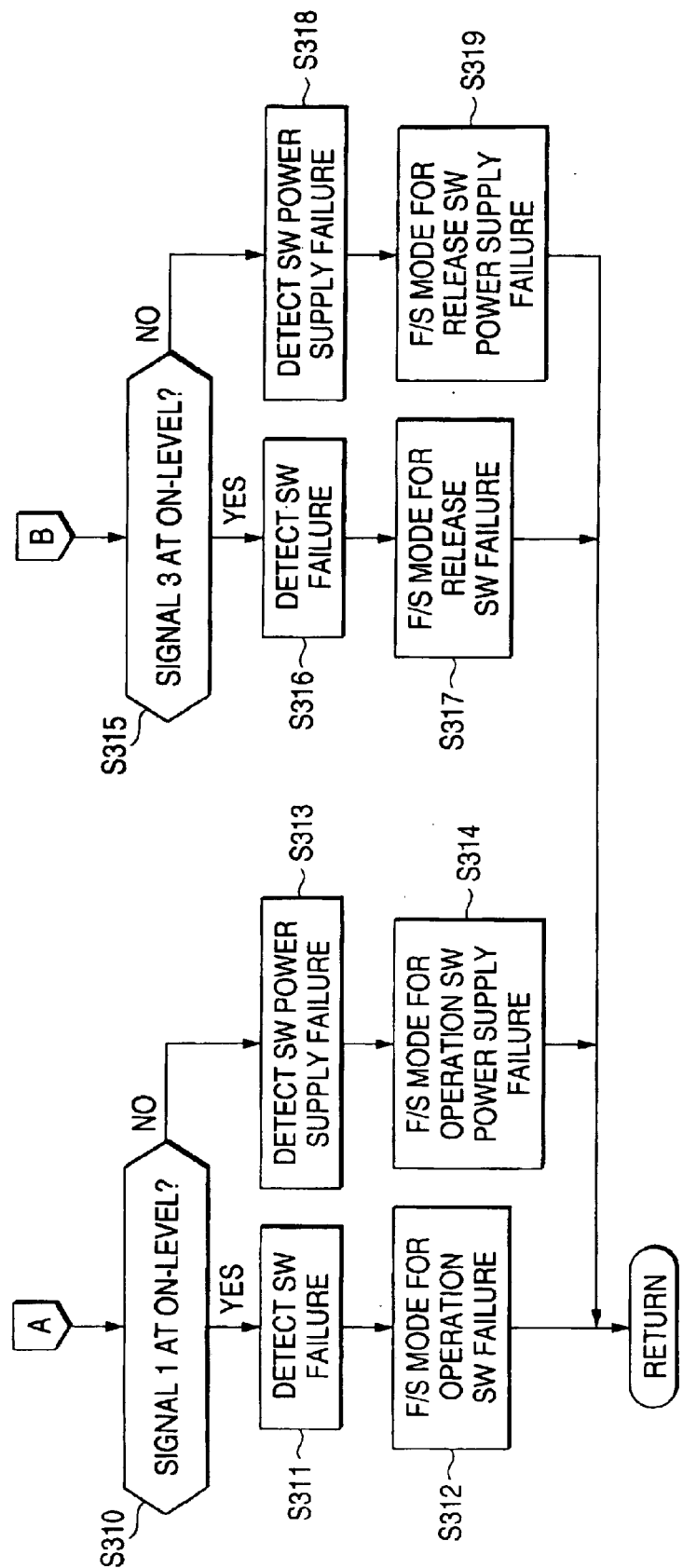
FIG. 7 is a second part of the flowchart illustrating the manual operation switch operation determination routine.
Figure 8:
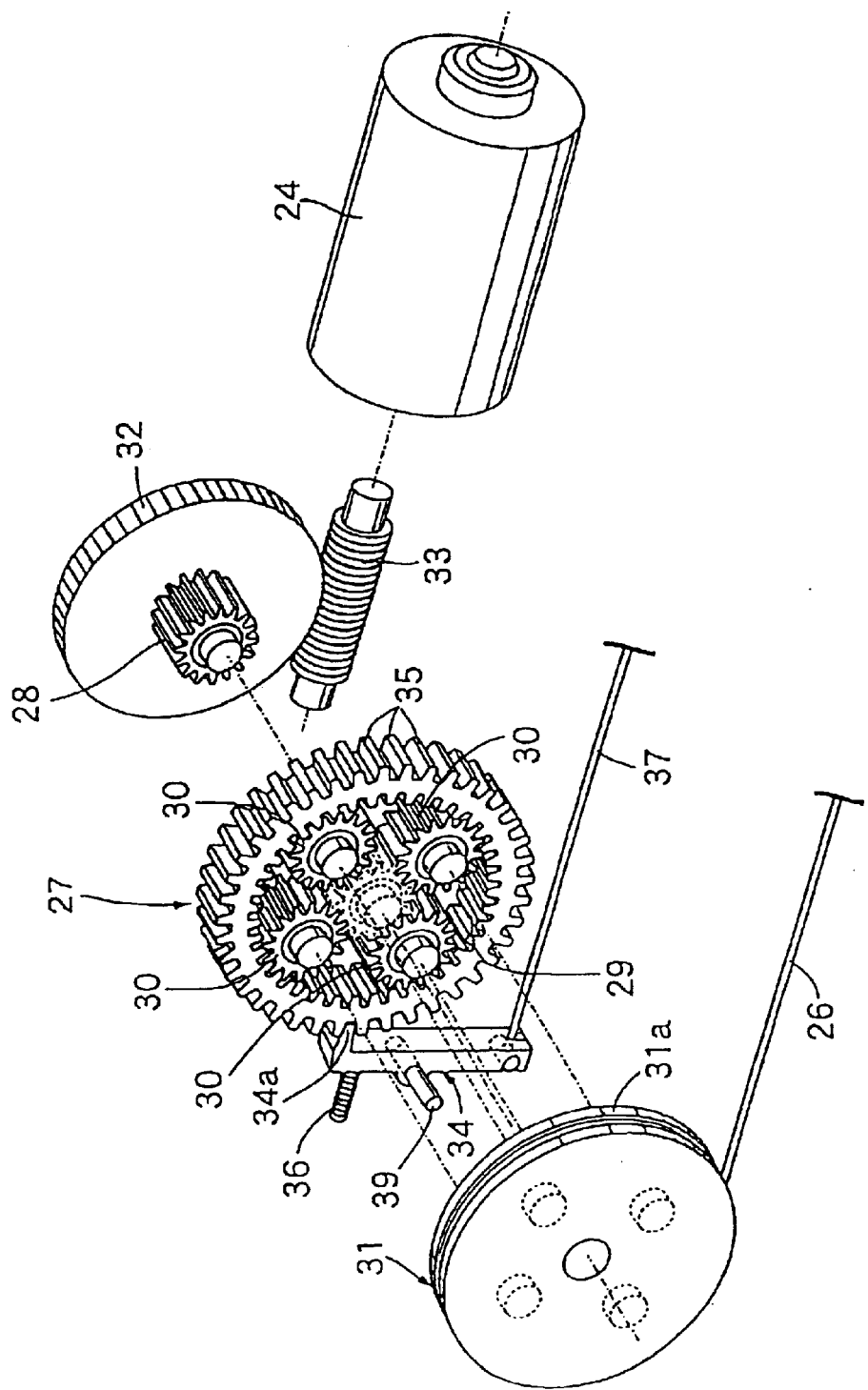
FIG. 8 is an exploded perspective view of the electric parking brake system.
Figure 9:
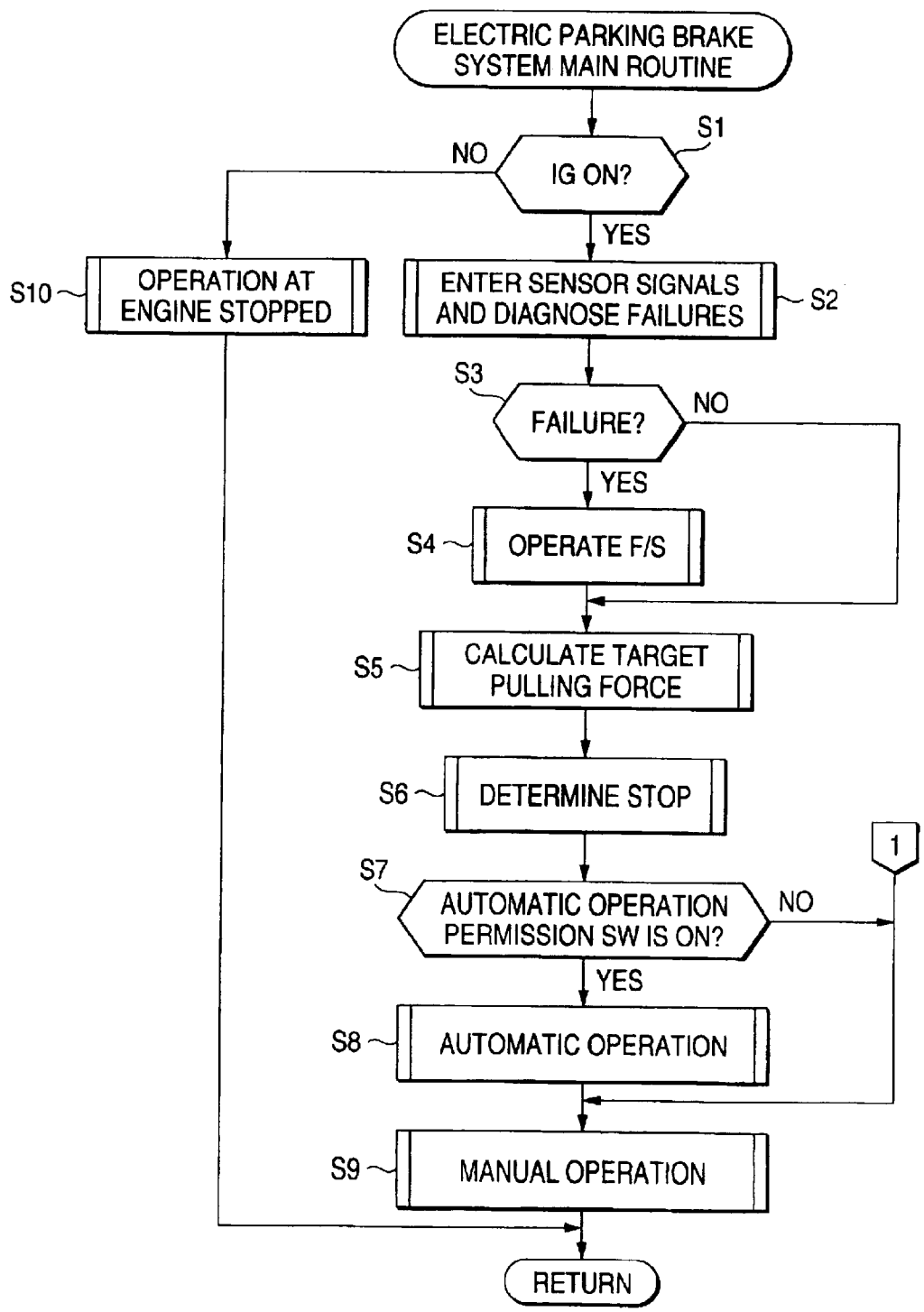
FIG. 9 is a flowchart of a main routine of the control of the electric parking brake system.
Figure 10:
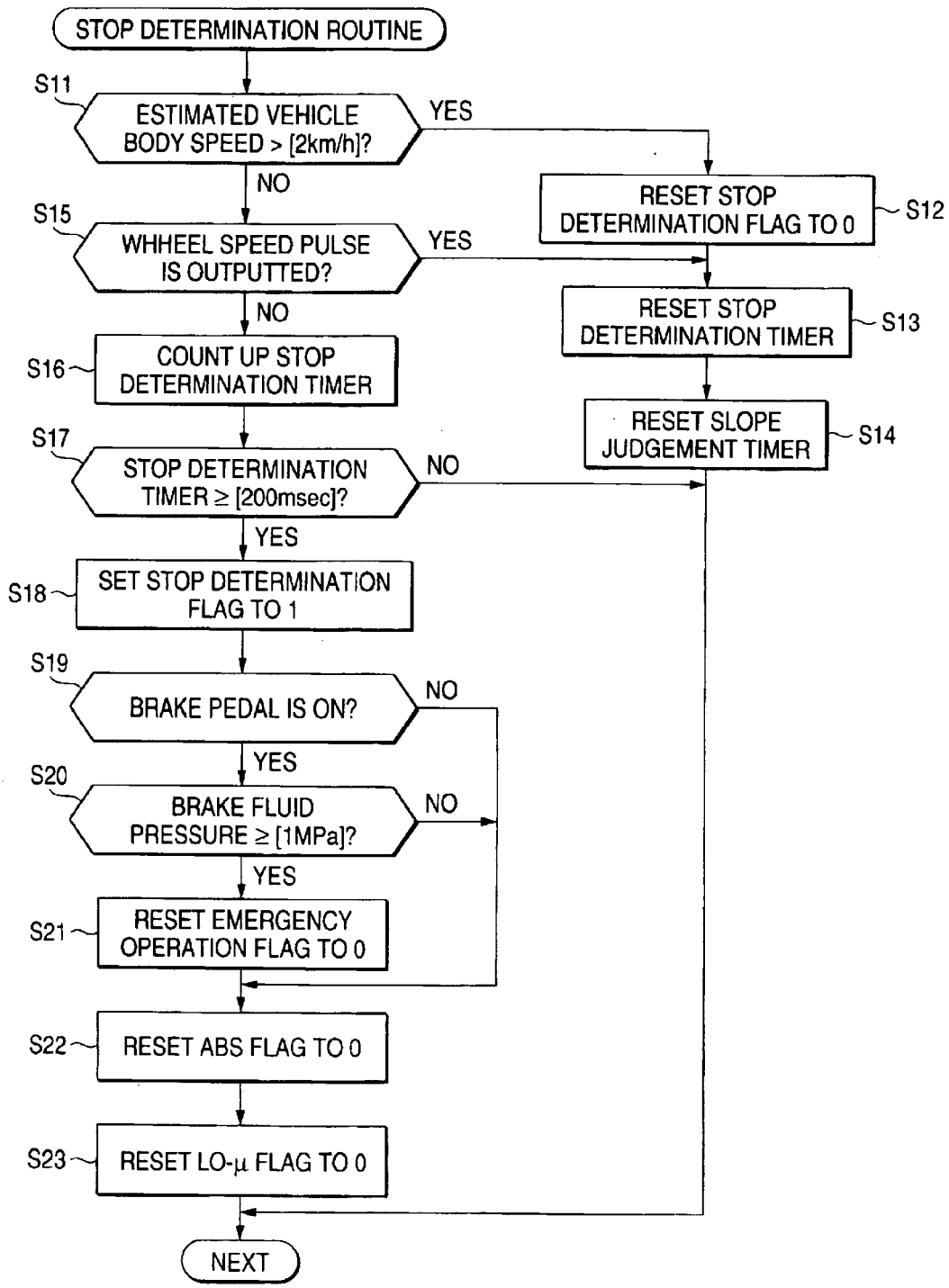
FIG. 10 is a flowchart of a stop determination routine.
Figure 13:
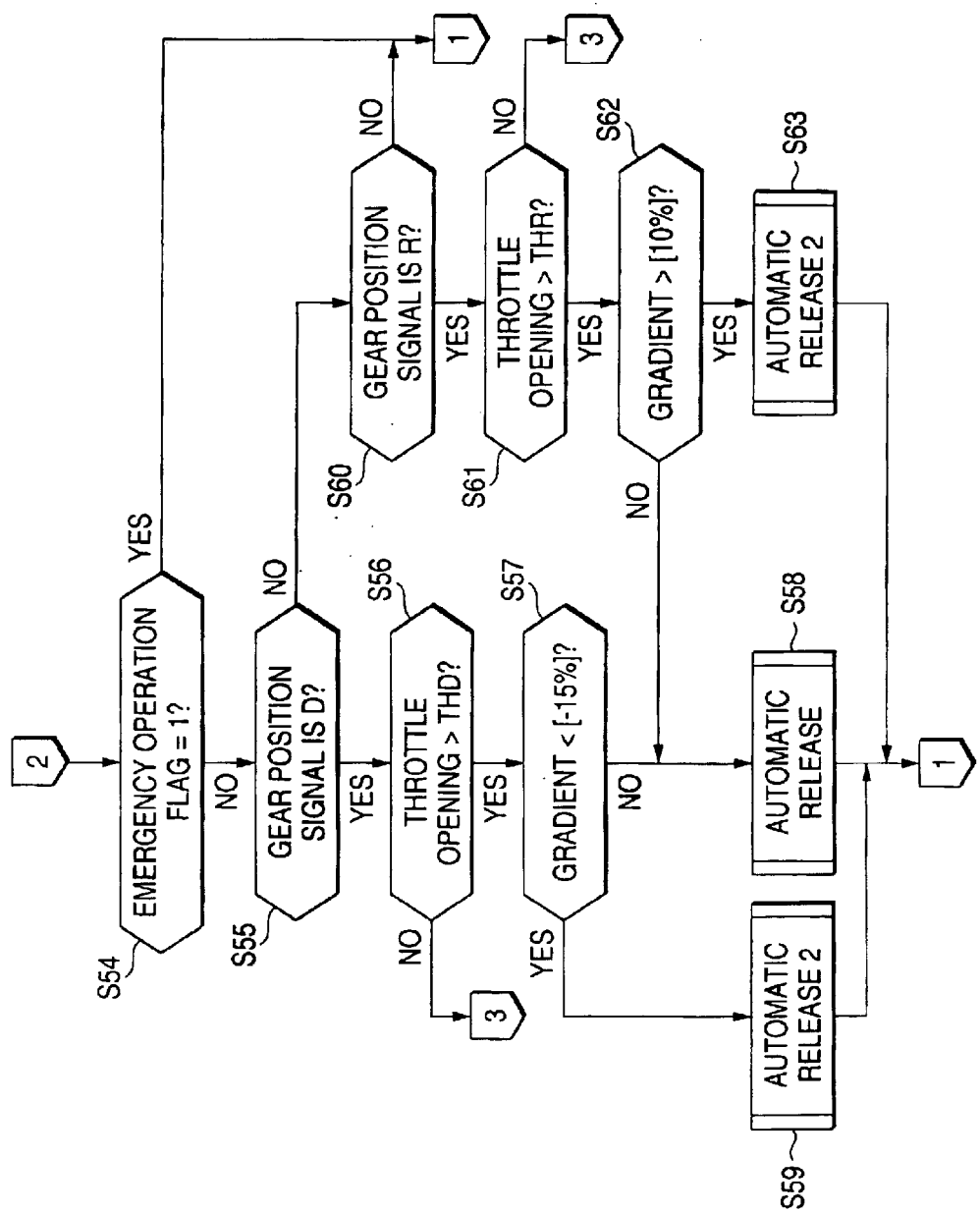
FIG. 13 is a third part of the flowchart of the automatic operation routine.
Figure 14:
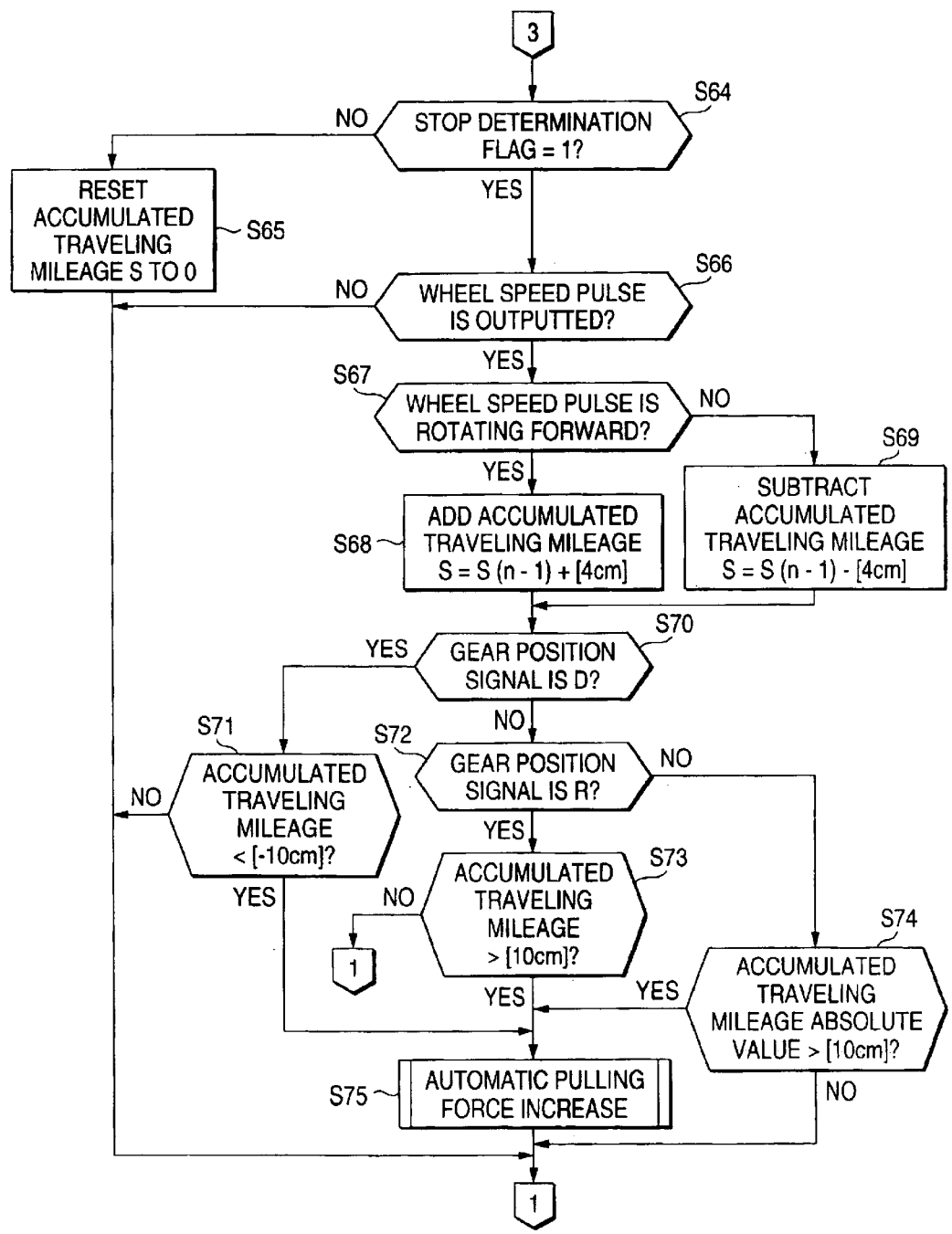
FIG. 14 is a fourth part of the flowchart of the automatic operation routine.
Figure 15:
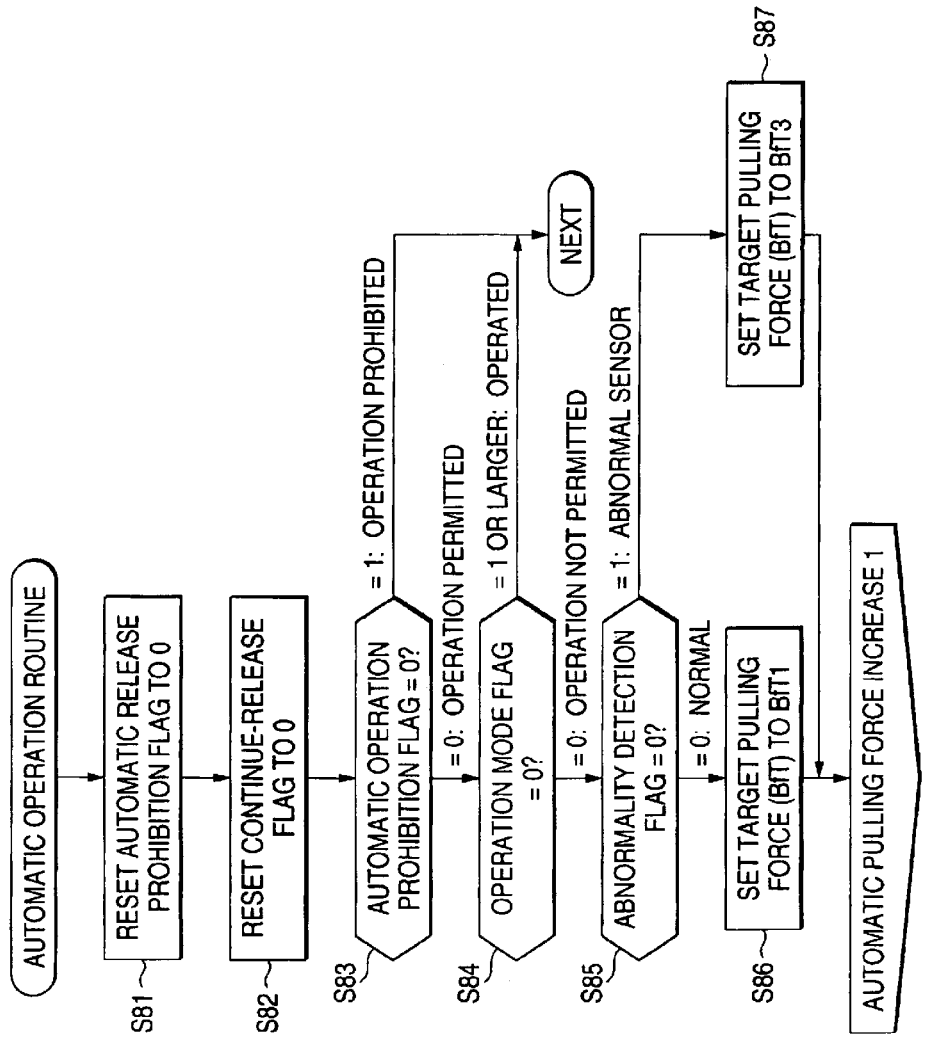
FIG. 15 is a first part of a flowchart of an automatic actuation routine.
Figure 16:
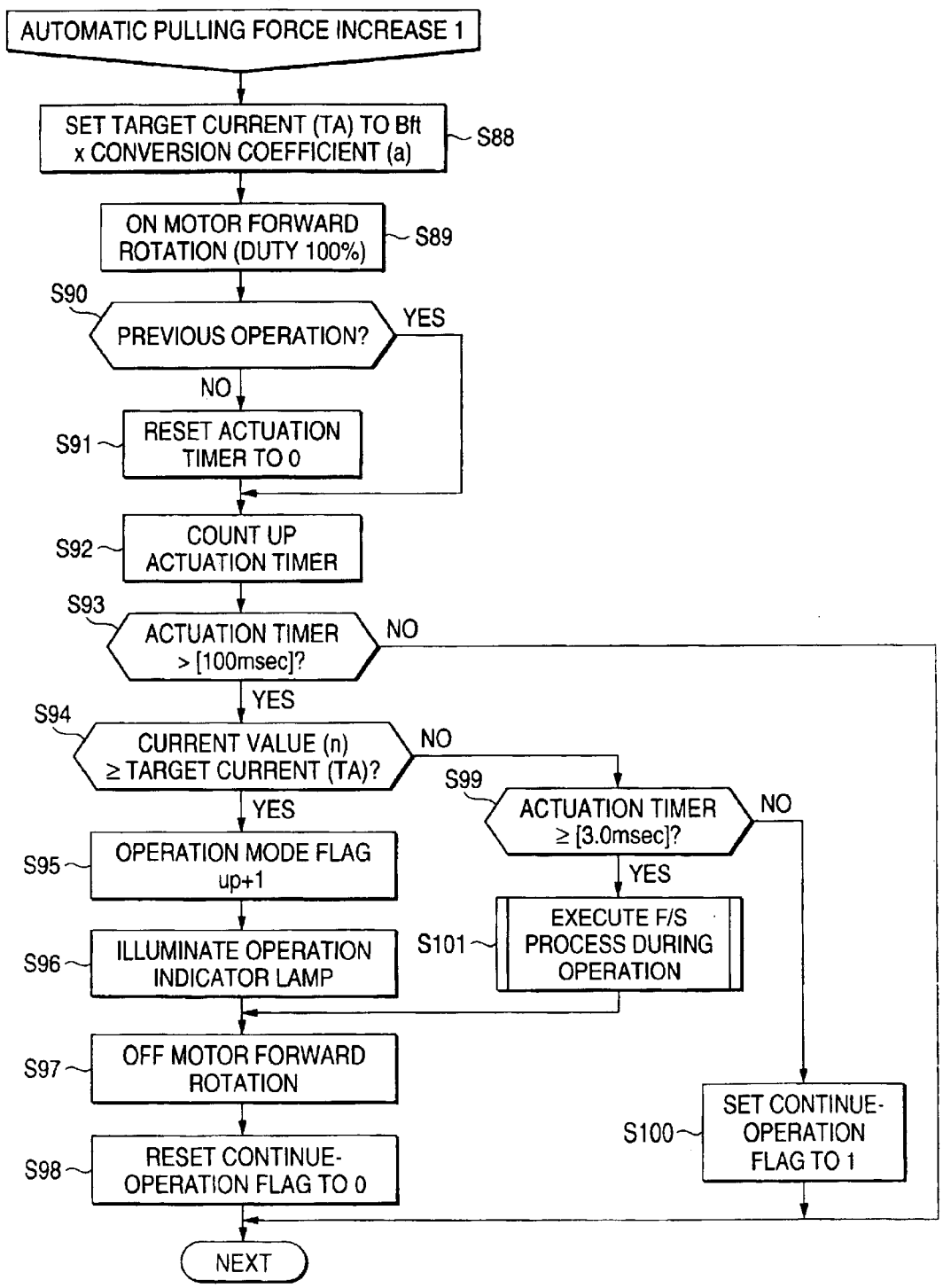
FIG. 16 is a second part of the flowchart of the automatic actuation routine.
Figure 17:
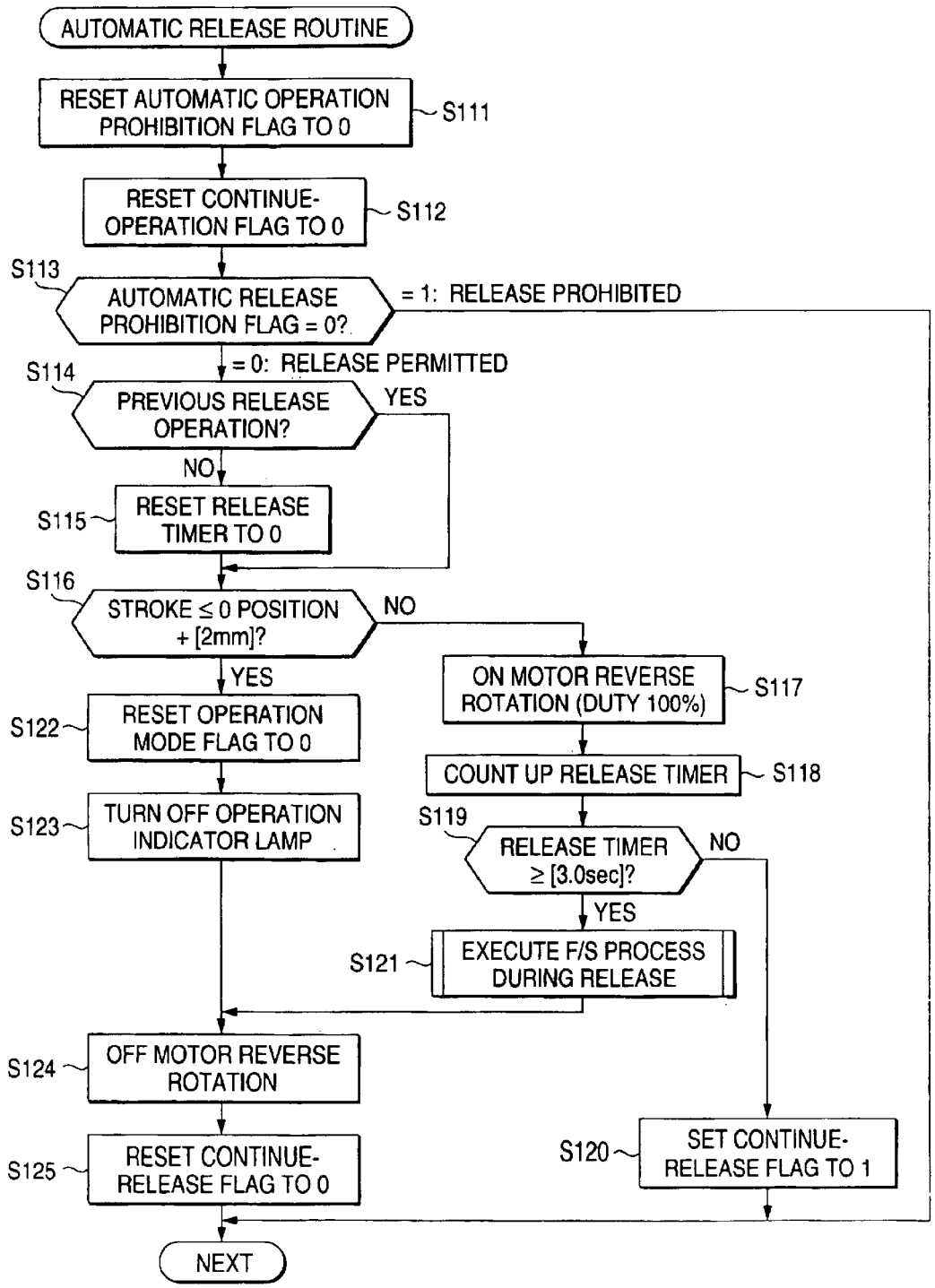
FIG. 17 is a flowchart of an automatic release.
Figure 18:
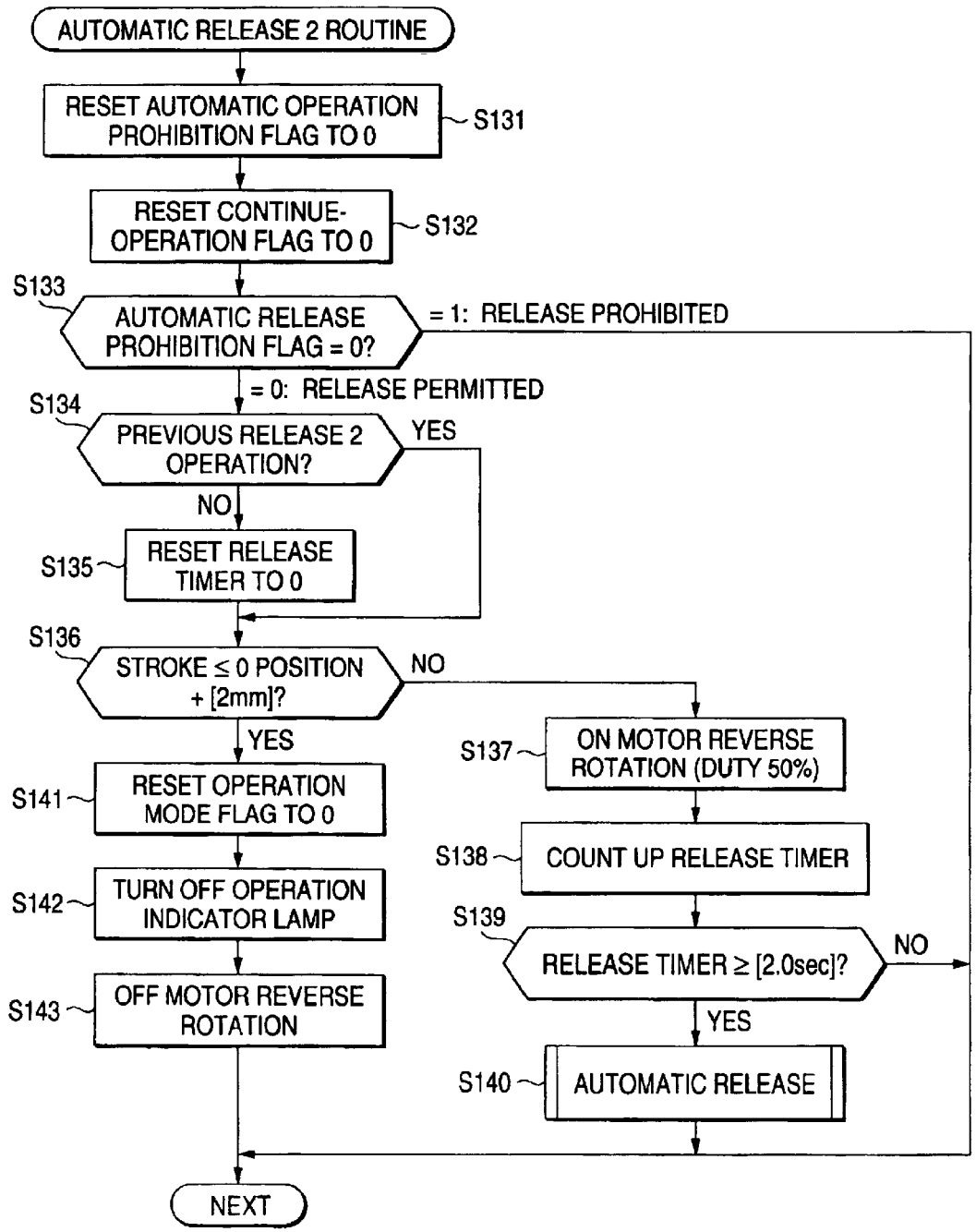
FIG. 18 is a flowchart of an automatic release 2.
Figure 19:
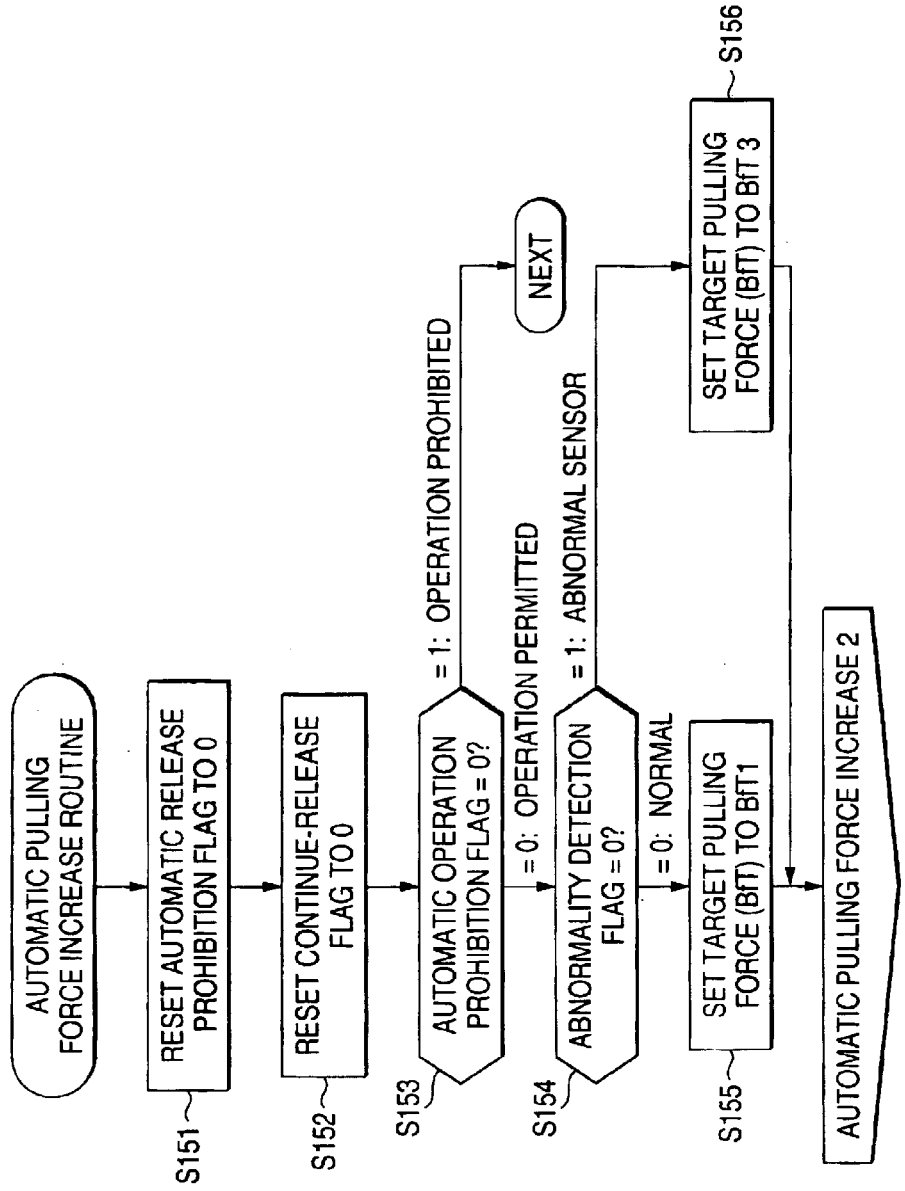
FIG. 19 is a first part of a flowchart of an automatic pulling force increase routine.
Figure 20:
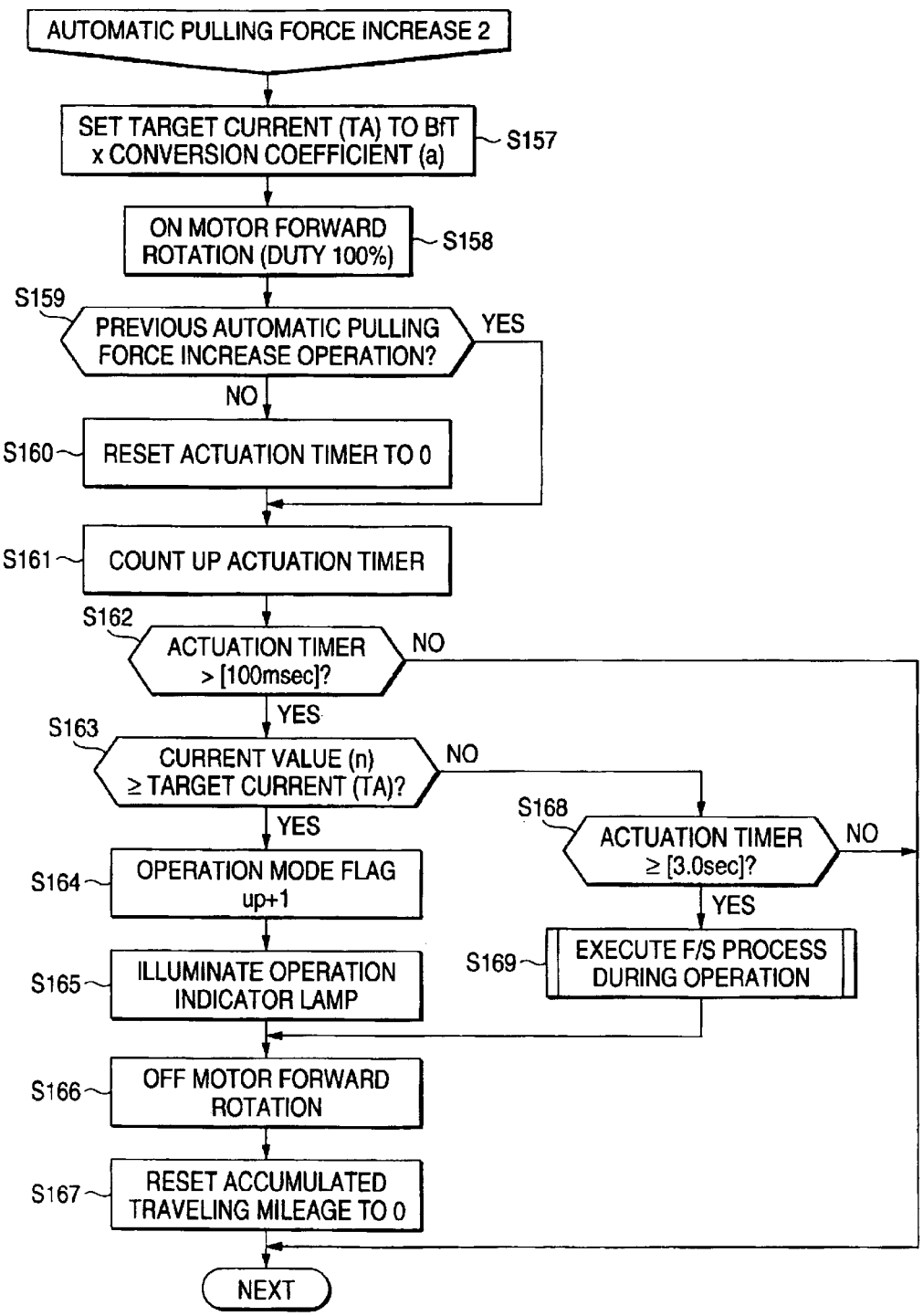
FIG. 20 is a second part of the flowchart of the automatic pulling force increase routine.
Figure 21:
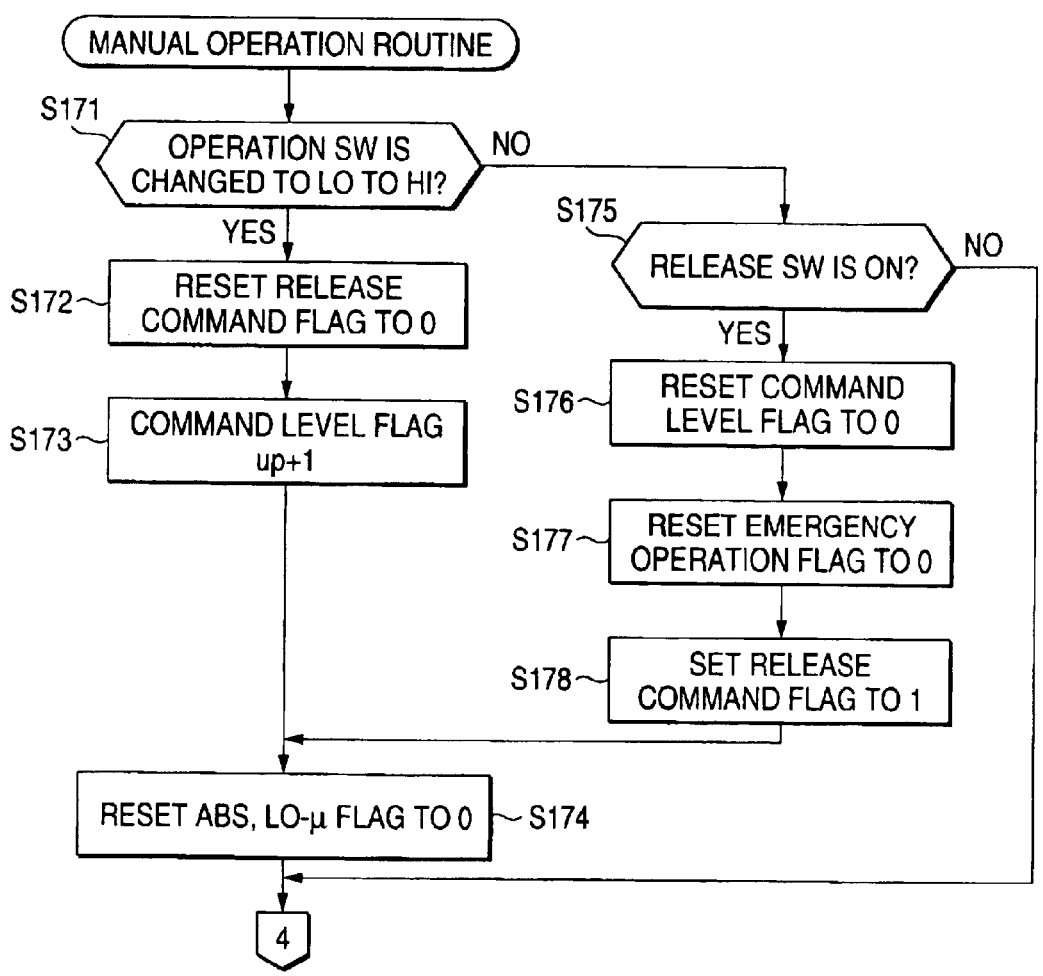
FIG. 21 is a first part of a flowchart of a manual operation routine.
Figure 22:
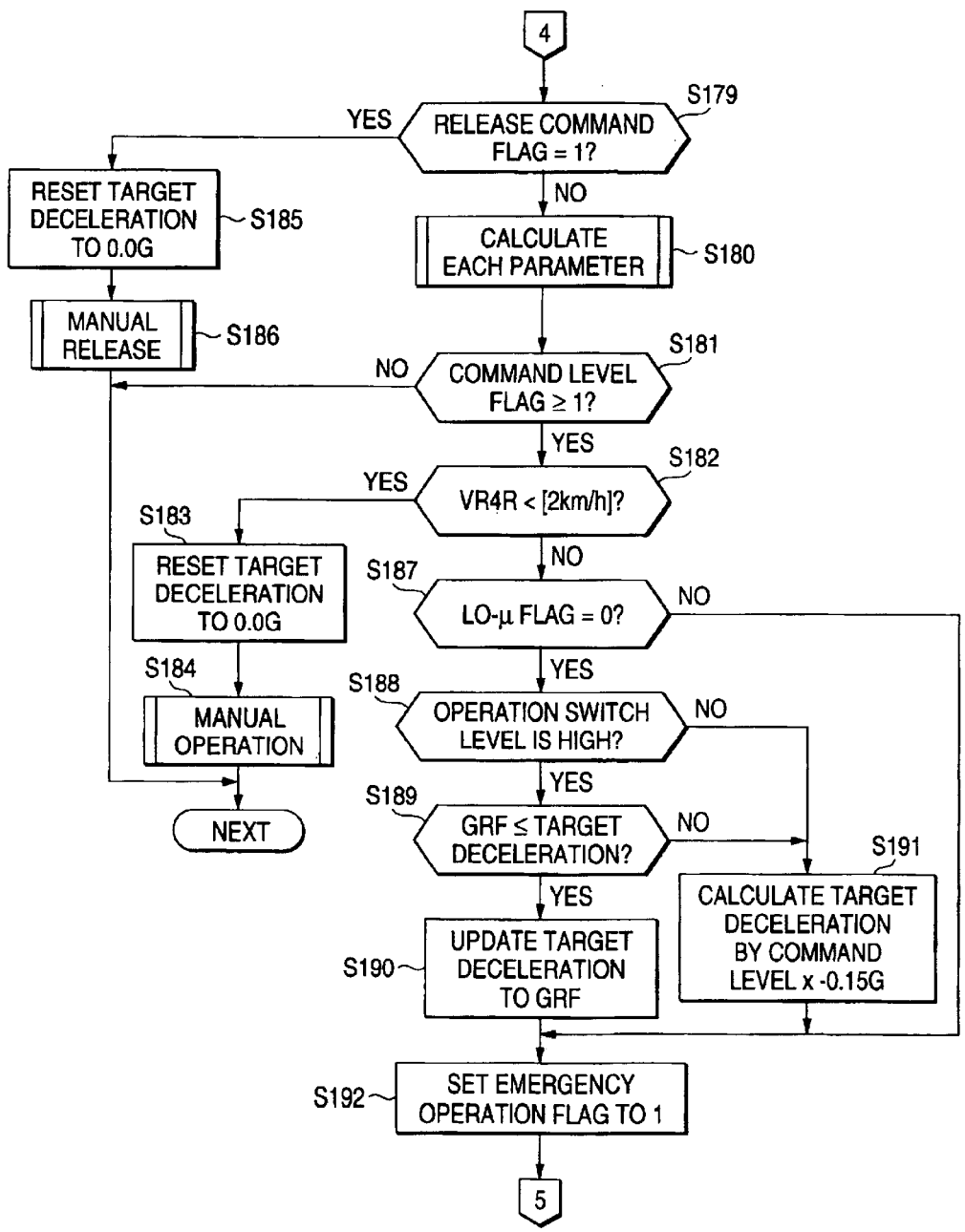
FIG. 22 is a second part of the flowchart of the manual operation routine.
Figure 23:
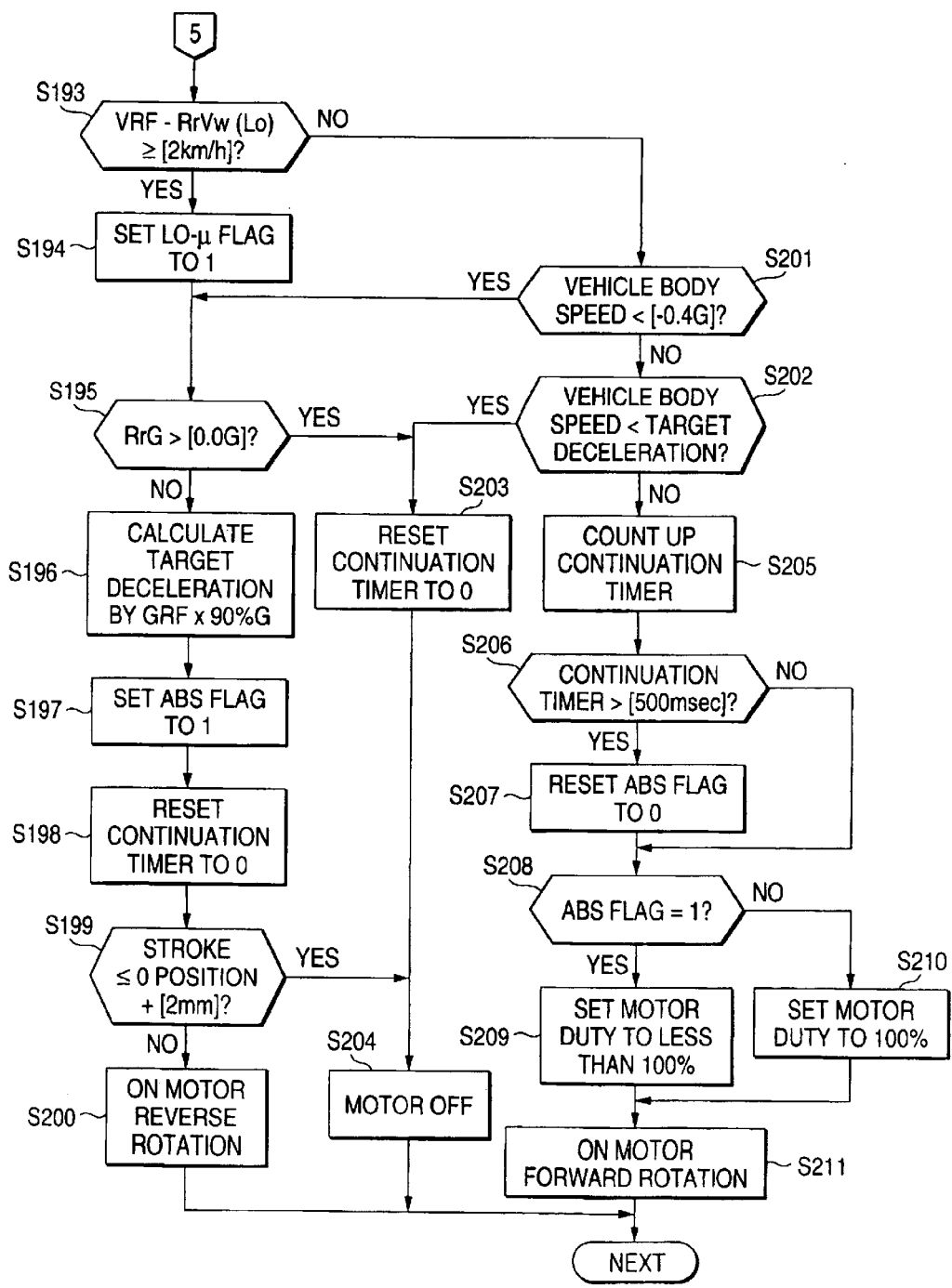
FIG. 23 is a third part of the flowchart of the manual operation routine.
Figure 24:
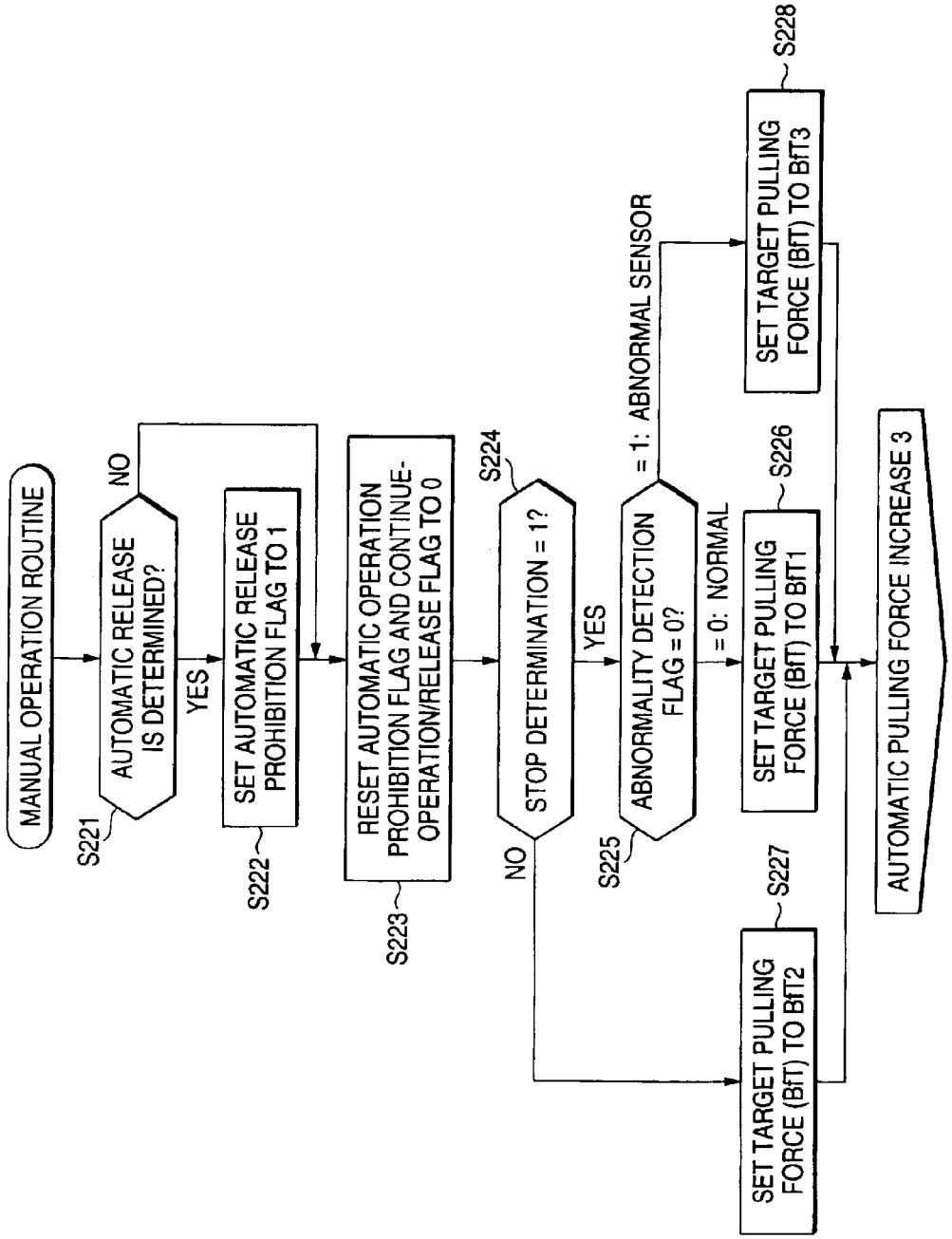
FIG. 24 is a first part of a flowchart of a manual actuation routine.
Figure 25:
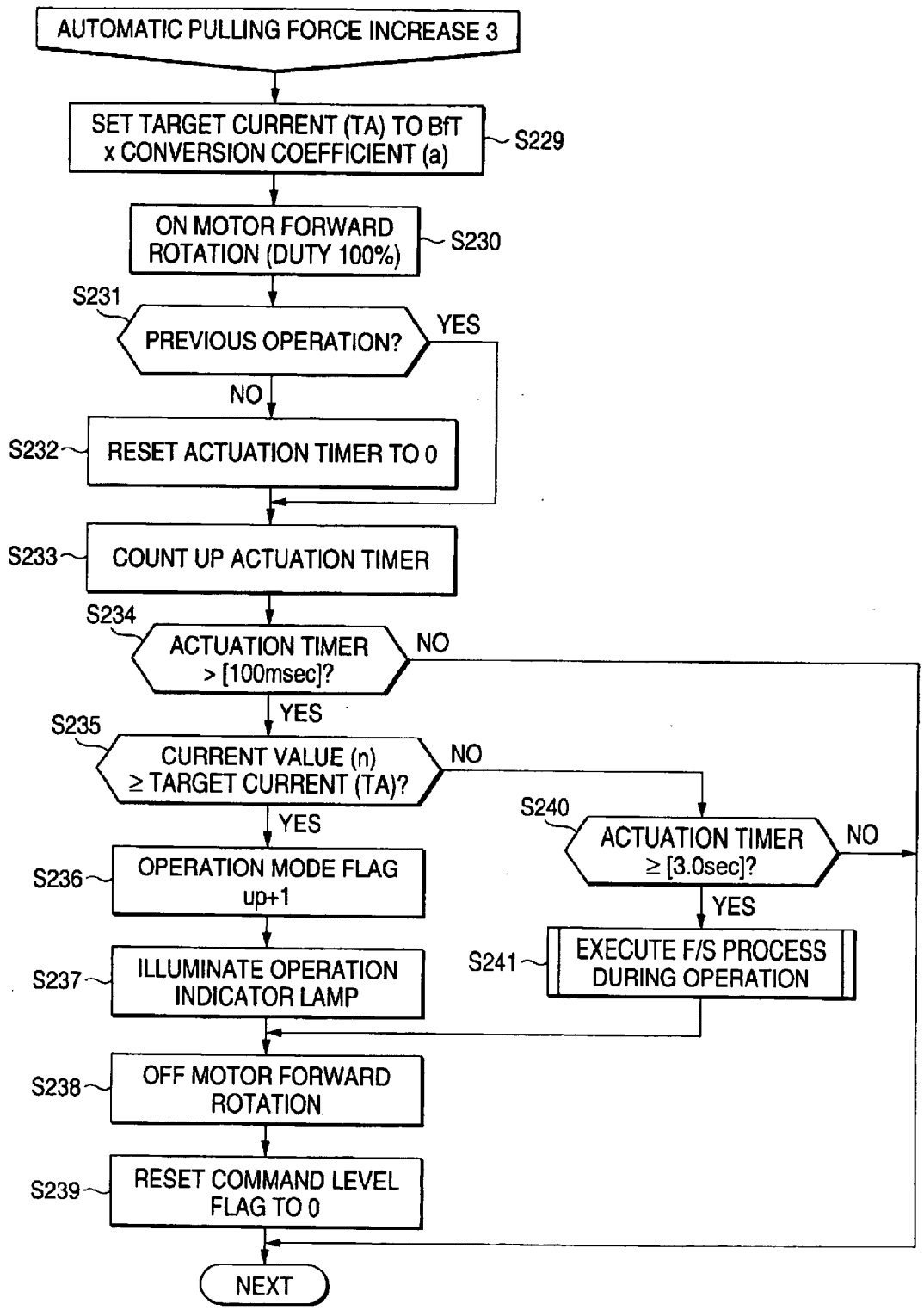
FIG. 25 is a second part of the flowchart of the manual actuation routine.
Figure 26:
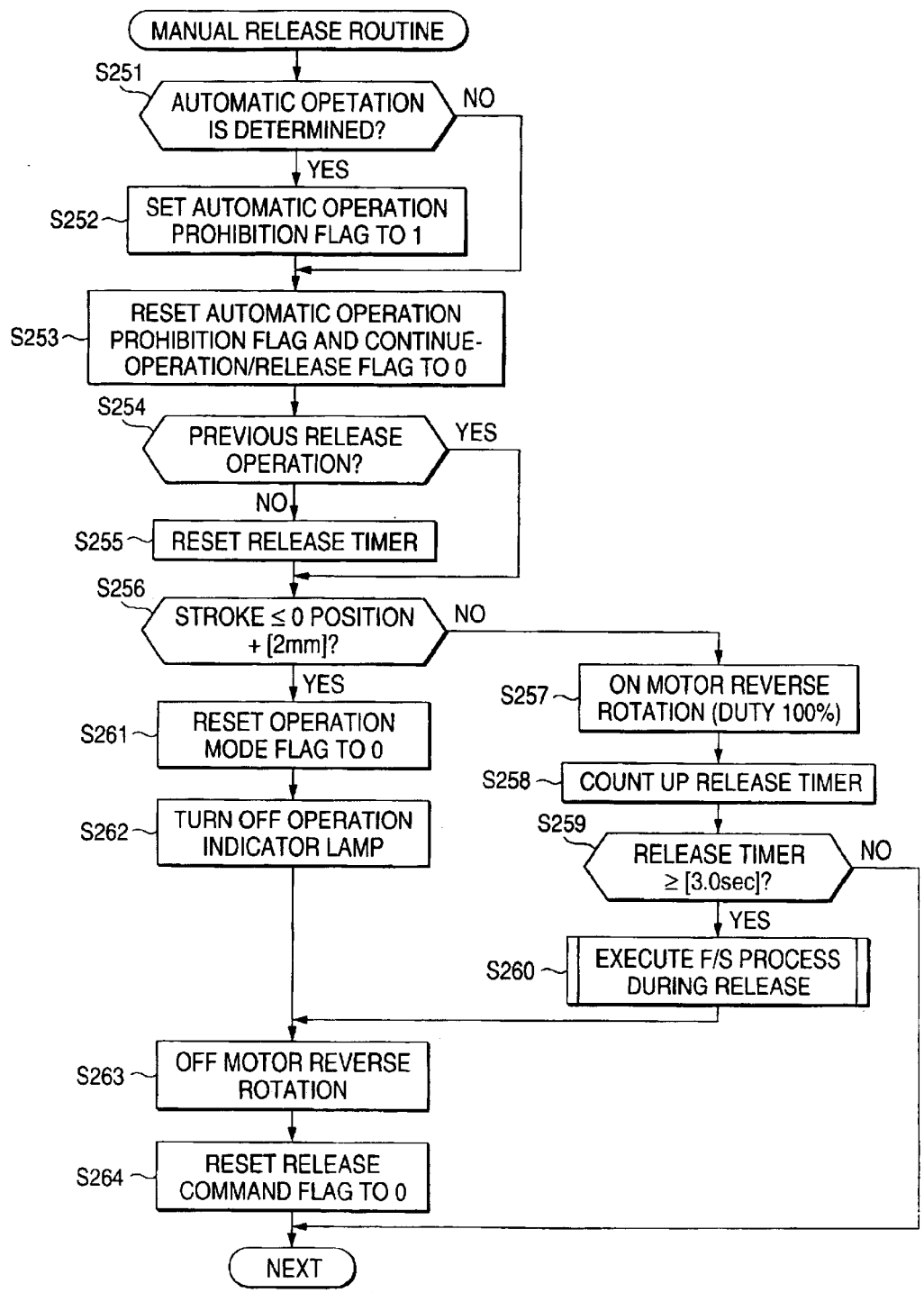
FIG. 26 is a flowchart of a manual release routine.
Figure 27:
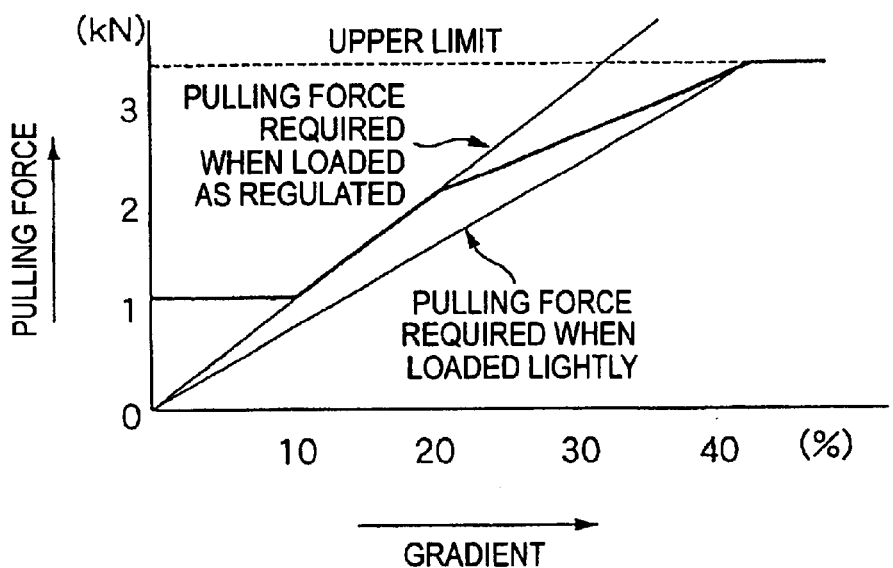
FIG. 27 is a map for retrieving a pulling force for the electric parking brake system from the gradient of a road surface.
Figure 28:
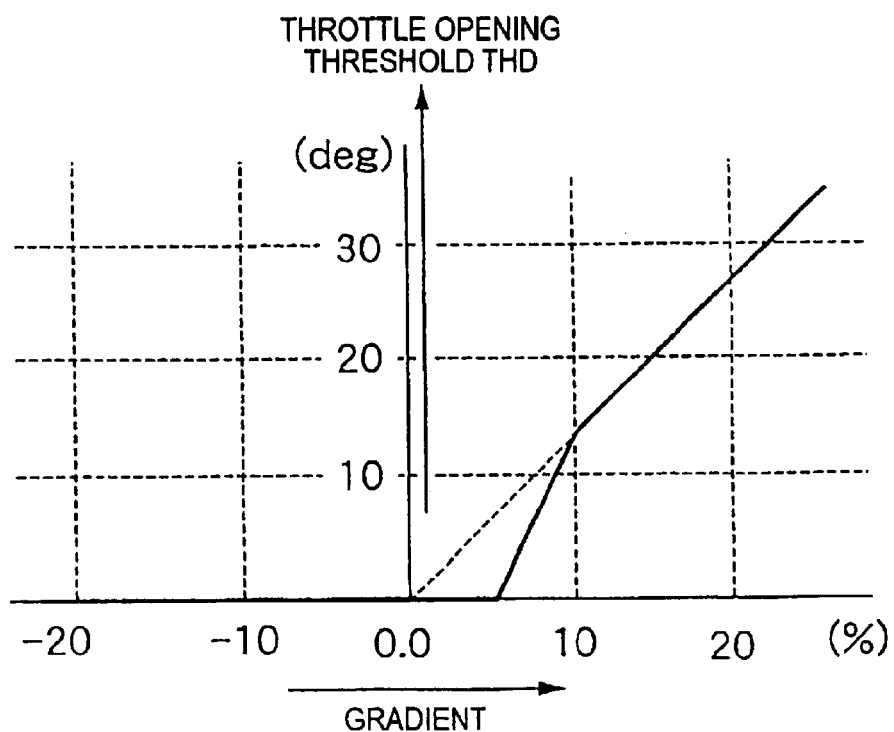
FIG. 28 is a map for retrieving a throttle opening from the gradient of the road surface.
Figure 29:
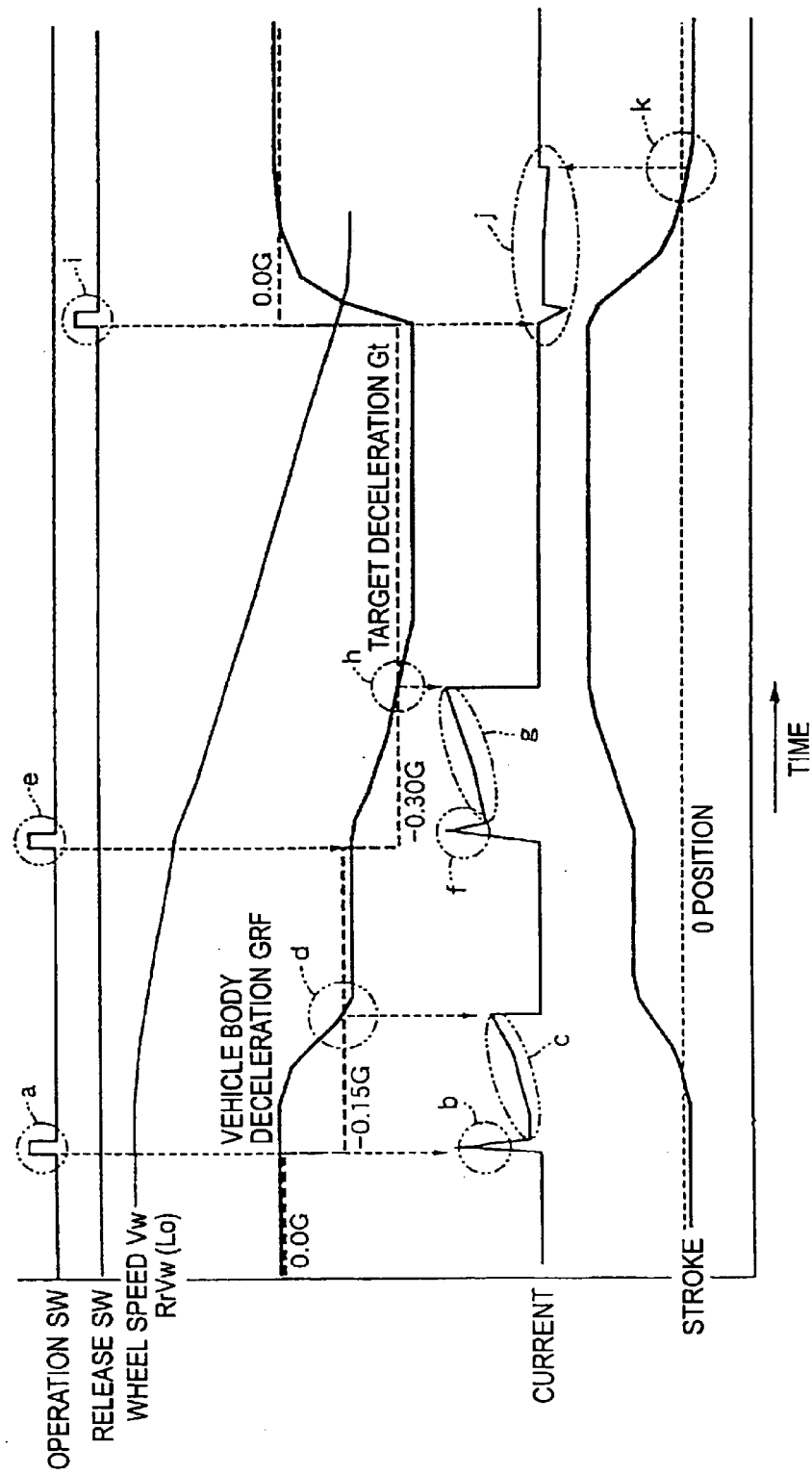
FIG. 29 is a timing diagram illustrating a function when an operation switch is depressed intermittently while a vehicle is running.
Figure 30:
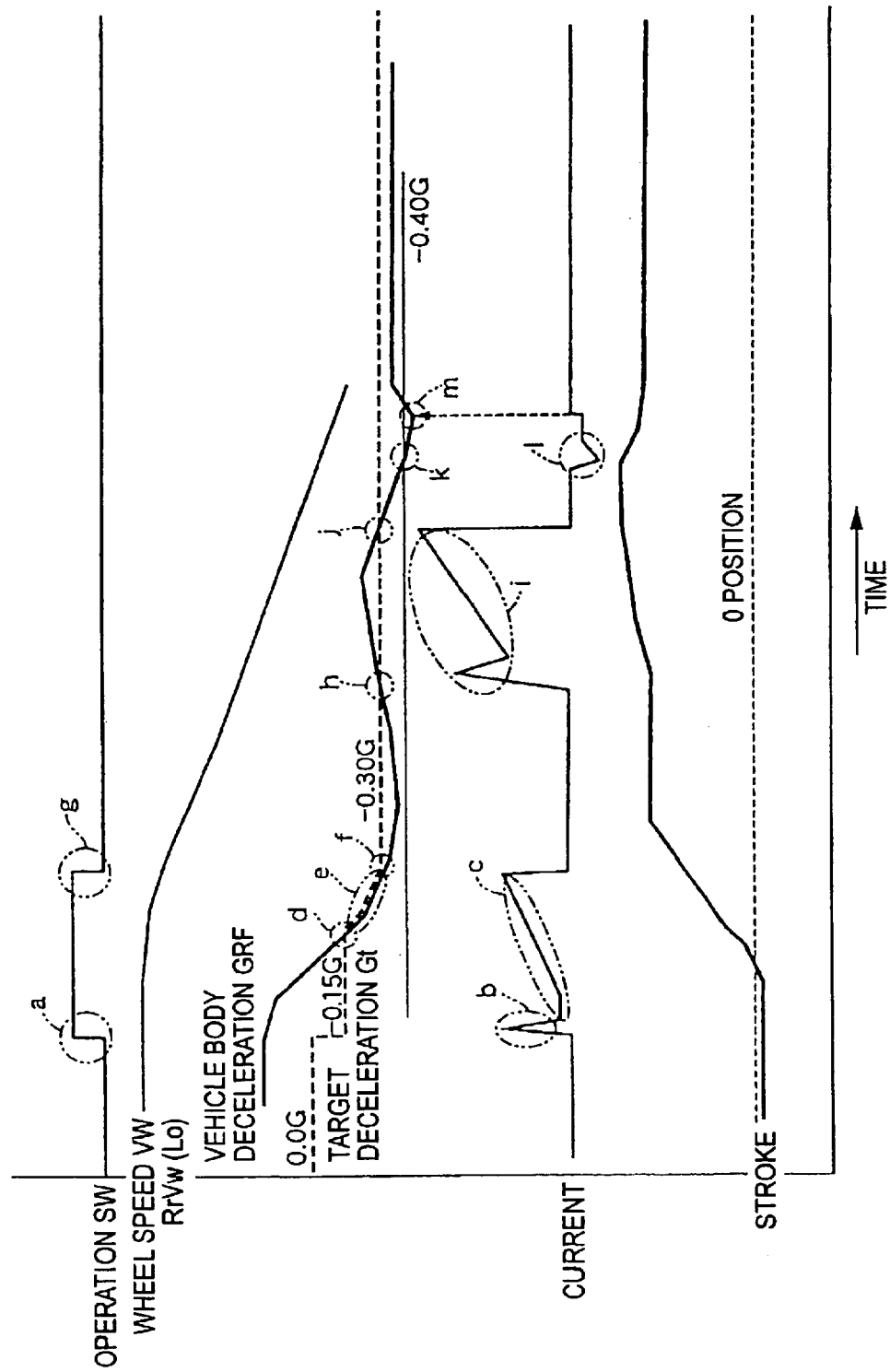
FIG. 30 is a timing diagram illustrating a function when the operation switch is depressed continuously while the vehicle is running.
Figure 31:
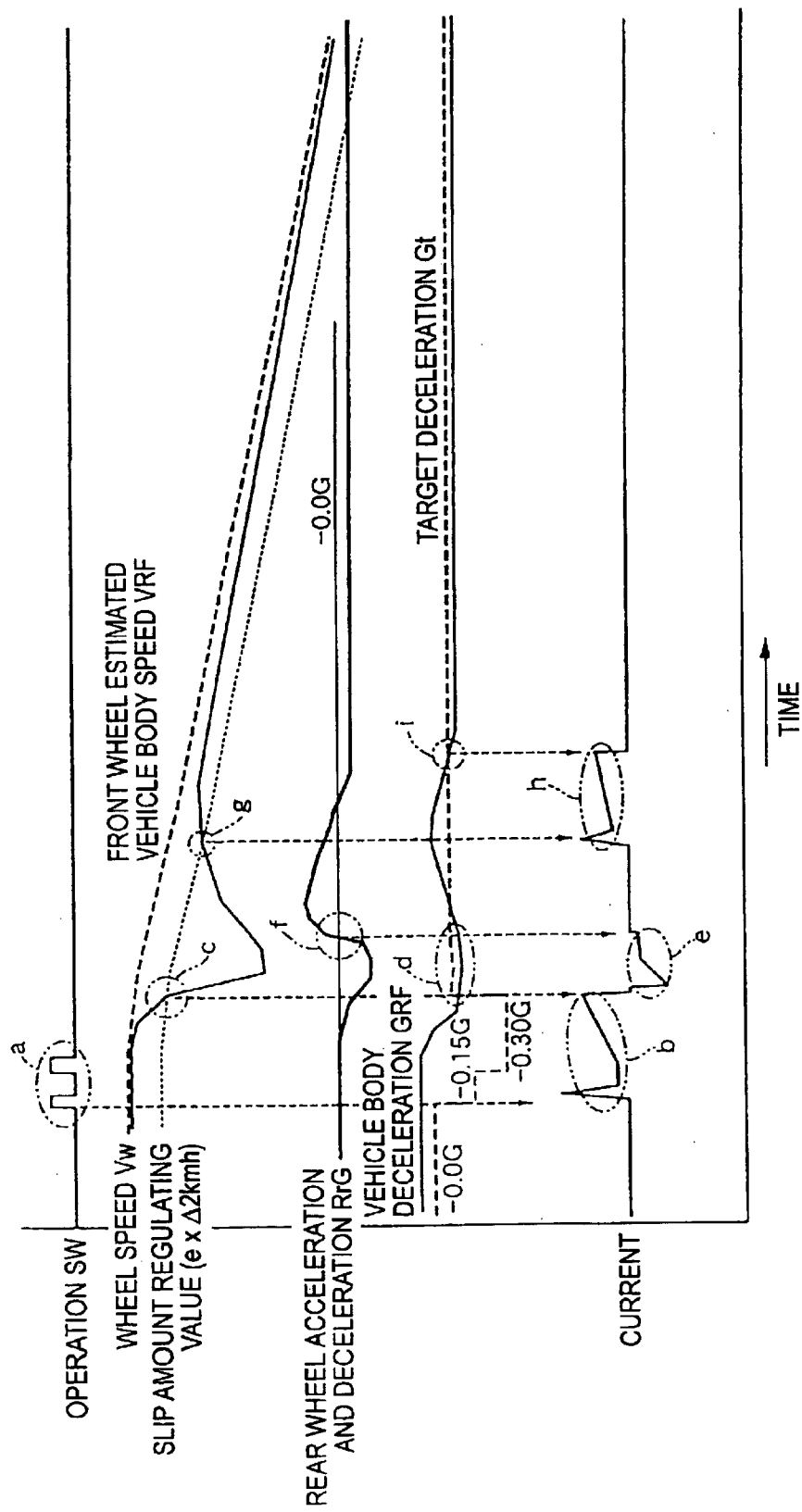
FIG. 31 is a timing diagram illustrating a function when the operation switch is depressed intermittently while the vehicle is running on a road surface having a small road surface friction coefficient.

FIGS. 1 to 31 show an embodiment of the invention, in which FIG. 1 is a plan view of a vehicle in which an electric parking brake system is installed, FIG. 2 is an explanatory view of a control system of the electric parking brake system, FIG. 3 is a drawing showing the configuration of a manual operation command switch, FIG. 4 is a circuit diagram of the manual operation command switch, FIG. 5 is an explanatory diagram of the operation of the manual operation command switch and output signals, FIGS. 6 and 7 are flowcharts of a manual operation command switch operation determination routine, FIG. 8 is an exploded perspective view of the electric parking brake system, FIG. 10 is a flowchart of a stop determination routine, FIGS. 11 to 14 are flowcharts of an automatic operation routine, FIGS. 15 and 16 are flowcharts of an automatic actuation routine, FIG. 17 is a flowchart of an automatic release routine, FIG. 18 is a flowchart of an automatic release 2 routine, FIGS. 19 and 20 are flowcharts of an automatic pulling force increase routine, FIGS. 21 to 23 are flowcharts of a manual operation routine, FIGS. 24 and 25 are flowcharts of a manual actuation routine, FIG. 26 is a flowchart of a manual release routine, FIG. 27 is a map for retrieving a pulling force for the electric parking brake system from the gradient of a road surface, FIG. 28 is a map for retrieving a throttle opening or position from the gradient of the road surface, FIG. 29 is a timing diagram illustrating the function of the electric parking brake system when the operating switch is depressed intermittently while the vehicle is running, FIG. 30 is a timing diagram illustrating the function of the electric parking brake system when the operating switch is depressed continuously while the vehicle is running, and FIG. 31 is a timing diagram illustrating the function of the electric parking brake system when the operating switch is depressed intermittently while the vehicle is running in a state in which the road surface friction coefficient is small.

As shown in FIG. 1, drum-type parking brakes 11, 11 are provided on left and right rear wheels Wr, Wr to which the driving force of an engine is transmitted via an automatic transmission, and an electric parking brake system 12 disposed beside the driver's seat connects to the parking brakes 11, 11 via left and right Bowden cables 13, 13. Each parking brake 11 is made up of a brake drum 14, a pair of brake shoes 15, 16 adapted to be brought into contact with an inner circumferential surface of the brake drum 14, a connecting rod 17 for connecting the brake shoes 15, 16 to each other and a lever 19 which is rotatably supported on the brake shoe 15 via a pin 18 at one end thereof, and the Bowden cable 13 is connected to the other end of the lever 19.

Consequently, when the Bowden cable 13 is pulled by an electric motor 24 provided on the parking brake system 12, the lever 19 rotates around the pin 18 in a clockwise direction as viewed in the drawing to apply a compression load on the connecting rod 17, whereby the brake shoe 16 is pushed to the left as viewed in the drawing so as to be pressed against the brake drum 14, whereas the brake shoe 15 is pushed to the right, as viewed in the drawing, via the connecting rod 17 and the pin 18 so as to be pressed against the brake drum 14, a braking force being thereby generated by the parking brake 11. On the contrary, when the Bowden cable 13 is loosened or released by the electric motor 24, the brake shoes 15, 16 are retracted from the brake drum 14 by virtue of the spring-back force of a return spring, which is not shown, whereby the braking force of the parking brake 11 is released.

As shown in FIG. 2, signals are inputted into an electric parking brake system ECU 22 which is fed from a power supply system 21 to control the operation of the electric parking brake system 12 from an automatic operation enabling switch 23a adapted for implementing a changeover between permission and prohibition of automatic operation, a manual operation command switch 23b from which commands to operate and release the electric parking brake system 12 are manually issued, an ignition switch 23c, four wheel speed sensors 23d, . . . each adapted for detecting the speed of each wheel, as well as the rotational direction thereof, a gear position sensor 23e adapted for detecting the position of a gear shifted to in the automatic transmission such as "P" (parking), "N" (neutral), "D" (drive) and "R" (reverse), a brake switch 23f adapted for detecting a depression of a brake pedal, a brake fluid pressure sensor 23g adapted for detecting the brake fluid pressure of a service brake, a throttle position sensor 23h adapted for detecting the opening or position of a throttle, a gradient sensor 23i made up of a G sensor to detect the inclined condition of the vehicle (the gradient of a road surface), and a stroke sensor 23i made up of a potentiometer to detect the amount of stroke of the Bowden cables 13, 13, and the ECU 22 controls based on signals so inputted the operation of the electric motor 24 which is a drive source for the electric parking brake system 12 and an operation indictor lamp 23k which indicates that the electric parking brake system 12 is being operated by the driver.

As shown in FIGS. 3. to 5, the manual operation command switch 23b is a three-position changeover switch of a self-return type, wherein the switch is normally located at an OFF position when not depressed, outputs an ON signal to the electric parking brake system ECU 22 while being depressed at an upper end thereof and outputs an OFF signal to the electric parking brake system ECU 22 while being depressed at a lower end thereof.

The manual operation command switch 23b includes an operation switch 41 and a release switch 42 which are disposed in parallel. Furthermore, the operation switch 41 is made up of a normally opened contact 41a and a normally closed contact 41b which are disposed in parallel, and the release switch 42 is made up of a normally opened contact 42a and a normally closed contact 42b which are disposed in parallel. When the upper end of the manual operation command switch 23b is depressed, the normally opened contact 41a and the normally closed contact 41b of the operation switch 41 are kept closed and opened, respectively, only by a duration of the depression. In addition, when the lower end of the manual operation command switch 23b is depressed, the normally opened contact 42a and the normally closed contact 42b of the release switch 42 are kept closed and opened, respectively, only by a duration of the depression.

TABLE 1

| | Signal 1 | Signal 2 | Signal 3 | Signal 4 |
|---|---|---|---|---|
| When SW is off | OFF | ON | OFF | ON |
| When Operation SW is on | ON | OFF | OFF | ON |
| When Release SW is on | OFF | ON | ON | OFF |

Table 1 shows combinations of ON and OFF of signals 1 to 4 which are outputted from the normally opened contact 41a, the normally closed contact 41b, the normally opened contact 42a and the normally closed contact 42b with reference to three cases where the manual operation command switch 23b is on, the operation switch 41 of the manual operation command switch 23b is on and the release switch 42 of the manual operation command switch 23b is on. The electric parking brake system ECU 22 determines on the operating conditions and failure of the manual operation command switch 23b based on the combinations of the signals 1 to 4.

Namely, with the combination of the signals 1 to 4 which are off, on, off and on (a condition shown in FIG. 4), it is determined that the manual operation command switch 23b is not yet operated (a neutral condition). In addition, with the combination of the signals 1 to 4 which are on, off, off and on, it is determined that the operation switch 41 of the manual operation command switch 23b is operated, and with the combination of the signals 1 to 4 which are off, on, on and off, it is determined that the release switch 42 of the manual operation command switch 23b is operated.

As shown in FIG. 5, based on the above determinations, the electric parking brake system ECU 22 forms no high-level pulse signal when the manual operation command switch 23b is in the neutral condition. When the operation switch 41 is depressed, the electric parking brake system ECU 22 then forms a high-level pulse signal corresponding to the operation switch 41 only by a duration of the depression, and when the release switch 42 is depressed, the electric parking brake system ECU 22 forms a high-level pulse signal corresponding to the release switch 42 only by a duration of the depression.

The operations as described above will be described further based on flowcharts shown in FIGS. 6 and 7.

Firstly, in step S301, read signals 1 to 4, and if the signal 1 and the signal 2 are determined not to coincide with each other in step S302, if the signal 3 and the signal 4 are determined not to coincide with each other in step S303, if the signal 1 is determined to be on in step S304, and if the signal 3 is determined to be off in step S305, in step s306, the electric parking brake system ECU 22 outputs an operation signal to operate the electric parking brake system 12. In addition, if the signal 1 is determined to be off in step S304, and if the signal 3 is determined to be on in step s307, in step S308, the electric parking brake system ECU 22 outputs a release signal to release the electric parking brake system 12. Furthermore, if the signal 1 is determined to be off in step S304, and the signal 3 is determined to be off in step S307, the electric parking brake system ECU 22 determines that the manual operation command switch 23b is in the neutral condition and outputs neither an operation signal nor a release signal.

It is the operation in the event that the manual operation command switch 23b is normal. However, if the signal 1 is determined to be on in step S304 and if the signal 3 is determined to be on in step S305, this is representative of a case where the release switch 42 is operated to an ON side with the operation switch 41 remaining sticking to an OFF side, or a case where the operation switch 41 is operated to an ON side with the release switch 42 remaining sticking to an OFF side, and in step S309, the electric parking brake system ECU 22 determines that the manual operation command switch 23b fails and gets stuck and then activates a fail safe mode for a sticking failure.

In addition, if the signal 1 and the signal 2 are determined to coincide with each other in step S302, the operation switch 41 or the power supply system 21 is determined to fail. Namely, if the signal 1 (as well as the signal 2, naturally) is at an ON level in step S310, then, in step S311, the electric parking brake system ECU 22 determines that a short-circuit failure is occurring between the normally opened contact 41a and the normally closed contact 41b and then triggers a fail safe mode for the failure of the operation switch 41a in step S312. On the other hand, if the signal 1 (as well as the signal 2, naturally) is at an OFF level in step S310, then, in step S313, the electric parking brake system ECU 22 determines that the power supply system fails and triggers a fail safe mode for the failure of the power supply system 21 in step S314.

In addition, if the signal 3 and the signal 4 coincide with each other in the step S303 above, the release switch 42 or the power supply switch 21 is determined to fail. Namely, if the signal 3 (as well as the signal 4, naturally) is at an ON level in step S315, then, in step S316, the electric parking brake system ECU 22 determines that a short-circuit failure is occurring between the normally opened contact 42a and the normally closed contact 42b and then triggers a fail safe mode for the failure of the release switch 42a in step S317. On the other hand, if the signal 3 (as well as the signal 4, naturally) is at an OFF level in step S315, then, in step S318, the electric parking brake system ECU 22 determines that the power supply system fails and triggers a fail safe mode for the failure of the power supply system 21 in step S319.

Thus, according to the manual operation command switch 23b, since not only can the sticking failure and short-circuit failure of the operation switch 41 and the release switch 42 be detected but also the failure of the power supply system 21, that is, the fault of a power supply itself, a disconnection in a wiring harness extended between the power supply system 21 and the manual operation command switch 23b and a contact failure of associated connectors can be detected, the reliability of the manual operation command switch 23b can be enhanced largely.

Note that the automatic operation enabling switch 23a (refer to FIG. 2) is a two-position changeover switch and is adapted to select one of an automatic operation permission position and an automatic operation prohibition position.

Next, the configuration of the electric parking brake system 12 will be described based on FIGS. 2 and 8.

A planetary gear mechanism 27 is accommodated in the interior of a casing 25 of the electric parking brake system 12 to pull in or feed out a pulling cable 26 by decelerating the rotation of the electric motor 24. The planetary gear mechanism 27 includes a sun gear 28, a ring gear 29 coaxially disposed on an outer circumference of the sun gear 28, a plurality of planetary gears 30 . . . (four planet gears in this embodiment) which mesh with both the sun gear 28 and the ring gear 29, and a planet carrier 31 which carries the planetary gears 30 . . . . A worm wheel 32 formed integrally with the sun gear 28 meshes with a worm 33 which is rotated by the electric motor 24.

In addition, a central portion of a lock lever 34 is supported on a support shaft 39 provided on the casing 25 in such a manner as to rock thereabout, and the ring gear 29 of the planetary gear mechanism 27 is restrained against the casing 25 in such a manner as to provide no rotation thereof when a locking pawl 34a provided at an upper end of the lock lever 34 is caused to engage with locking teeth 35 . . . formed in an outer circumference of the ring gear 29 by virtue of the spring-back force of a spring 36. When a lock release lever, not shown, which is provided at an end of a lock release cable 37 which connects to a lower end of the lock lever 34 is pulled, the lock lever 34 rocks about the support shaft 39 against the spring-back force of the spring 36, and the locking pawl 34a is retracted from the locking teeth 35 . . . , whereby the rotation of the ring gear 29 is permitted.

A take-up drum 31a is integrally formed on an outer circumference of the planet carrier 31, and the pulling cable 26 wound around an outer circumference of the take-up drum 31a is connected to a central portion of an equalizer 38. The Bowden cables 13, 13 are each made up of an outer tube 13a and an inner cable 13b, and the inner cables 13b, 13b extending outwardly from the pair of outer tubes 13a, 13a which are fixed to an end portion of the casing 25 are then connected to end portions of the equalizer 38 which makes uniform the tensions of the both inner cables 13b, 13b.

Consequently, when the electric motor 24 is driven to rotate forward, the sun gear 28 of the planetary gear mechanism 27 rotates via the worm 33 and the worm wheel 32, and since the ring gear 29 is restrained from rotating by the lock lever 34, the planetary gears 30 . . . which mesh with the ring gear 29 walk around the sun gear 28 together with the planet carrier 31 while rotating on their own axes. When the rotation of the electric motor 24 is decelerated as just is described to be transmitted to the planet carrier 31, the pulling cable 26 wound around the take-up drum 31a is pulled in, and the pulling force thereof is equally distributed to the pair of Bowden cables 13, 13 via the equalizer 38, whereby the left and right parking brakes are applied to generate a braking force. In addition, when the electric motor 24 rotates reversely, the take-up drum 31a rotates in a reverse direction to feed out the pulling cable 26 from the take-up drum 31a, whereby the left and right parking brakes 11, 11 are released.

While the parking brake system 12 is in operation, the tensions of the inner cables 13b, 13b of the Bowden cables 13, 13 are transmitted reversely via the equalizer 38, the pulling cable 26, the take-up drum 31a, the planetary gear mechanism 27, and the worm wheel 32 and the worm 33 so as to rotate the electric motor 24. However, since the reverse transmission of the driving force from the worm wheel 32 side to the worm 33 side is not possible due to the power transmission properties of the worm wheel 32 and the worm 33, there occurs no case where a torque is applied to the electric motor 24 by virtue of the tensions of the inner cables 13b, 13b. As a result, the necessity for a special locking device for holding the operating condition of the electric parking brake system 12 and a lock current for interrupting the rotation of the electric motor 24 by virtue of an external force is obviated, which contributes to the simplification of the construction of the system and reduction in power consumption by the electric motor 24.

In addition, in case the electric motor 24 becomes inoperable while the electric parking brake system 12 is in operation, when the lock lever 34 is rocked by the lock release cable 37 against the spring-back force of the spring 36, the locking pawl 34a of the lock lever 34 is disengaged from the locking teeth 35 . . . to thereby permit the rotation of the ring gear 29. As a result, even if the sun gear 28 connected to the electric motor 24 which is being inoperable cannot rotate, since the ring gear 29 can rotate, the planet carrier 31 can rotate together with the take-up drum 31a with the planetary gears 30 . . . rotating on their own axes. As a result, the take-up drum 31a rotates by virtue of the spring-back force of return springs, not shown, which are provided in the wheel brakes 11, 11, and the pulling cable 26 and the inner cables 13b, 13b of the Bowden cables 13, 13 are loosened, whereby the wheel brakes 11, 11 are released to thereby allow the vehicle to be driven.

Next, referring to the flowcharts, the control of the electric parking brake system 12 will be described. Note that in the following description, an "automatic operation mode" is a mode that is selected when the automatic operation enabling switch 23a (refer to FIG. 2) is at an ON position and includes an "automatic actuation" in which the electric parking brake system 12 is automatically actuated according to the running conditions of the vehicle and an "automatic release" in which the electric parking brake system 12 is automatically released. In addition, also note that a "manual operation mode" is a mode in which one of a "manual actuation" and a "manual release" is manually selected by the driver who operates the manual operation command switch 23b (refer to FIG. 2) in an emergency.

Firstly, a main routine will be described based on the flowchart shown in FIG. 9.

In step S1, if the ignition switch 23c is on, in step S2, read outputs from the respective sensors and switches 23a to 23j to diagnose the existence of a failure by determining whether or not the output values are normal. In step S3, if there is found a certain failure, then, in step S4, a fail safe operation is implemented. In the following step S5, a target pulling force for the electric parking brake system 12 is calculated, and in step S6, a stop determination is executed. In the following step S7, if the automatic operation enabling switch 23a is on, then in step S8, an automatic operation (an automatic actuation or an automatic release) is performed. In the following step S9, a manual operation (a manual actuation or a manual release) is performed. In addition, in the step S1, if the ignition switch is off, in step 10, an operation to be performed when the engine is stopped is performed.

In the step S7, if the automatic operation is not permitted and the manual operation mode is being applied, skip the automatic operation in the step S8, whereby, even in the event that there exists a possibility that the vehicle moves in a reverse direction due to the gradient of a road surface, the electric parking brake system 12 is actuated and an automatic pulling force increase (refer to step S75 in FIG. 14) to interrupt the reverse movement of the vehicle is not executed. In addition, if an actuation (release) condition exists in the manual operation mode, the actuation (release) condition continues as long as the manual operation command switch 23b is not operated whether the reason for resulting in the actuation (release) is attributed to the operation of the manual operation command switch 23b or the condition in the automatic operation mode continues.

Furthermore, if the automatic operation mode exists in the step S7, when the manual operation command switch 23b is operated to execute an actuation (a release) to act against the determination to perform the automatic operation mode, an automatic release (actuation) flag is set to "1", which will be described later, whereby the automatic release (the automatic actuation) which follows the determination to perform the automatic operation mode is prohibited until the determination to perform the automatic operation mode is changed thereafter to coincide with an actuation (a release) command by the manual operation command switch 23b, that is, an automatic release (actuation) prohibition flag is reset to "0".

Thus, in the condition where the automatic operation mode is selected, when the manual operation command, which does not coincide with the result of the determination to perform the automatic operation mode is issued, priority is given to the manual operation command, and the electric parking brake system 12 is actuated and released, whereby, even when the automatic operation mode is being selected, the electric parking brake system 12 can be actuated and released according to the intention of the driver. In addition, in the event that the determination to perform the automatic operation mode changes to coincide with the manual operation mode command, the electric parking brake system 12 is actuated and released based on the result of the determination to perform the automatic operation mode, whereby the automatic operation mode can be restored without needing a special operation, and the function of the automatic operation mode can be exhibited to a maximum extent.

The contents of the "target pulling force calculation" in the step S5, the "stop determination" in the step S6, the "automatic operation" in the step S8 and the "manual operation" in the step S9 will be described individually.

Firstly, the target pulling force calculation will be described in detail. The target pulling force includes a first target pulling force BfT1, a second target pulling force BfT2 and a third target pulling force BfT3.

The first target pulling force BfT1 is such as to be used in both the automatic operation mode and the manual operation mode on conditions that the vehicle is at rest and is calculated as below.

$$BfT1 = (\text{pulling force map value}) \times (\text{state coefficient } k)$$

The pulling force map is such as to retrieve pulling forces using the gradient (the value of tan θ when the inclination angle is θ) of a road surface as a parameter and there are prepared pulling force maps for upward and downward slopes for the respective gear positions of "P", "N", "D" and "R".

FIG. 27 shows a pulling force map for an upward slope for the "D" position. In an area where the gradient ranges from 0% to 10%, a certain pulling force with which the movement of the vehicle can be prevented is set as a pulling force map value. The reason for this is as below. Even when the vehicle is stopped on an inclined ground, in the event that the vehicle is not loaded uniformly, that is, the vehicle is loaded at the front or at the rear, the vehicle body becomes substantially horizontal and hence there may occur a case where the gradient sensor 23i indicates a "flat ground". In this case, in the event that the parking brakes 11, 11 are actuated based on the output of the gradient sensor 23i which indicates the "flat ground", the braking force becomes insufficient, and hence there is caused a concern that the vehicle moves. In an area where the gradient ranges from greater than 10% to 20%, since the change in load applied to the vehicle becomes large due to the driver and/or passengers getting in and out of the vehicle and luggage or cargo being loaded on and unloaded from the vehicle, a pulling force required when the vehicle is loaded as regulated which is larger than a pulling force required when the vehicle is loaded less than regulated is used as the pulling force map value. In an area where the gradient ranges from greater than 20% to 45%, the puling force map value varies linearly from the pulling force required when the vehicle is loaded as regulated to the pulling force required when the vehicle is loaded less than regulated. Then, in an area where the gradient is greater than 45%, the pulling force map value is set to a certain upper limit value. Thus, by differentiating the rate of change in pulling force in the respective road surface gradient areas, appropriate pulling forces can be set according to the various gradients.

TABLE 2

| Operation Mode F | State Coefficient k |
|---|---|
| =0 | 1.0 |
| =1 | 1.5 |
| ≧2 | 2.0 |

As shown in Table 2, the state coefficient k changes with an operation mode flag, and in the event that the operation mode flag F="0", the state coefficient k=1, in the event that the operation mode flag F=1, the state coefficient k=1.5, and in the event that the operation mode flag F≧2, the state coefficient k=2.0. Since the pulling force maps are set for the respective gear positions of "P", "N", "D" and "R", the value of the state coefficient k in Table 2 is not changed according to the gear positions.

In addition, the operation mode flag increases from "0" to "1" to "2" every time the operation switch 41 of the manual operation command switch 23b is depressed in a state in which an estimated vehicle body speed VR4R is less than 2 km/h, that is, the vehicle is substantially at rest, whereby the target pulling force BfT1 is increased, and once it reaches its upper limit value, "2", the target pulling force BfT1 is held to "2", even if the operation switch 41 of the manual operation command switch 23b is depressed further. Incidentally, a command level flag, which will be described later on, has a function to increase from "0" to "1" to "2" every time the operation switch 41 of the manual operation command switch 23b is depressed in a state in which the estimated vehicle body speed VR4R is equal to or greater than 2 km/h, that is, the vehicle is substantially running, whereby the target deceleration Gt is increased.

In addition, in this specification, while the deceleration is represented by a negative value, that the deceleration is large means that the absolute value of the deceleration is large, whereas that the deceleration is small means that the absolute value of the deceleration is small. For example, a deceleration of −0.3 G represents a deceleration which is larger than a deceleration of −0.15 G.

The second target pulling force BfT2 is such as to be used when the estimated vehicle body speed VR4R estimated from the wheel speed of the four wheels in the manual operation mode is VR4R<2 km/h and the fact that the vehicle stops is not yet determined and is calculated as below.

$BfT2$=(braking force corresponding to 0.15 $G$)×(state coefficient $k$)

The reason why 0.15 G, which is a fixed value, is used in the above equation is because the output from the gradient sensor 23i made up of a G sensor is not reliable when the stop of the vehicle is not yet determined. A braking force corresponding to 0.15 G is not a braking force which can bring the vehicle to a sudden stop but a braking force which brings the vehicle to a slow stop.

The third target pulling force BfT3 is such as to be used when the gradient sensor 23i becomes out of order when the stop of the vehicle is determined in both the automatic operation mode and the manual operation mode and is calculated as below.

$BfT3$=(braking force corresponding to a braking force which can hold the vehicle in a stopped condition on a slope of a gradient of 30%)×(state coefficient $k$)

Thus, by setting the third target pulling force BfT3 to the sufficiently large value when the gradient sensor 23i becomes out of order, the sliding down of the vehicle can be prevented in an ensured fashion.

TABLE 3

| | Running Conditions | | |
|---|---|---|---|
| Modes | Stop determined | VR4R < 2 km/h and Stop not determined | VR4R ≧ 2 km/h |
| Automatic Operation | BfT1 or BfT3 | inoperative | inoperative |
| Manual Operation | BfT1 or BfT3 | BfT2 | Pulling force is controlled such that the vehicle decelerates at the target deceleration. |

As is described above, the first target pulling force BfT1 to the third target pulling force BfT3 are selected according to the combinations of the vehicle conditions and operation modes. As shown in Table 3, when the stop of the vehicle is determined, the first target pulling force Bft1 or the third target pulling force BfT3 is adopted in either of the automatic operation mode and the manual operation mode. In addition, when the estimated vehicle body speed VR4R is less than 2 km/h and the stop of the vehicle is not yet determined, the electric parking brake system 12 remains inoperative in the automatic operation mode, whereas in the manual operation mode, the second target pulling force BfT2 is adopted. Furthermore, when the estimated vehicle body speed VR4R is equal to or faster than 2 km/h, the electric parking brake system 12 remains inoperative in the automatic operation mode, whereas in the manual operation mode, the braking force of the electric parking brake system 12 is controlled such that the vehicle decelerates at the target deceleration Gt.

Next, based on the flowchart in FIG. 10, a stop determination routine which is a subroutine of step S6 of the flowchart in FIG. 9 will be described.

Firstly, in step S11, the estimated vehicle body speed VR4R exceeds 2 km/h, in step S12, a stop determination flag is reset to "0". Note that when the stop determination flag="0", a condition where the stop of the vehicle is not determined is stored and that when the stop determination flag="1", a condition where the stop of the vehicle is determined is stored. In case the stop determination flag is reset to "0" when the estimated vehicle body speed VR4R exceeds 0 km/h, while there is caused a drawback that the stop determination flag is reset to "0" from minute vibrations of the vehicle body and noise from the wheel speed sensors 23d . . . , according to the embodiment, in the event that the stop determination flag is reset to "0" when the estimated vehicle body speed VR4R exceeds 2 km/h, the aforesaid drawback can be avoided.

In the following step S13, a stop determination timer (200 msec in the embodiment) is reset, and in step S14, a slope judgment timer (200 msec in the embodiment) is reset. In addition, even if the estimated vehicle body speed VR4R is equal to or less than 2 km/h in the step S11, in step S15, if a wheel speed pulse of any of the four wheel speed sensors 23d . . . is outputted, move to the steps S13, S14.

Thus, by resetting the stop determination timer every time the wheel speed pulse is outputted, the stop determination is not performed unless a condition where no wheel speed pulse is outputted continues with no interruption 200 msec or longer. In addition, by resetting the slope judgment timer every time the wheel speed pulse is outputted, the slope judgment is not performed unless a condition where no wheel speed pulse is outputted continues with no interruption 200 msec or longer. This is because the gradient sensor 23i is made up of the G sensor and senses an extremely low speed movement to output an erroneous gradient amount.

If no wheel speed pulse is outputted from any of the wheel speed sensors 23d . . . in the step S15, then, in step S16, the stop determination timer is counted, and if the stop determination timer provides a count of 200 msec or longer in step S17, in step S18, the stop determination flag is set to "1". The reason why the stop determination is not performed based on a condition where a signal from the brake switch 23f is on, that is, the brake pedal is depressed is because in case the driver releases the brake pedal before 200 msec elapses at the stop determination timer, no stop determination is performed and no automatic actuation is executed. For example, assume that the vehicle is stopped on the flat ground and the gear is shifted to the "N" position, immediately after the brake pedal being released. In this condition, while it should be automatically actuated, the electric parking brake system 12 is not automatically actuated.

In the following step S19, if the brake pedal is determined to be depressed, the brake switch 23f being determined to be on, and if a brake fluid pressure detected by the brake fluid pressure sensor 23g is determined to be equal to or larger than a predetermined value (1 MPa in the embodiment) in step S20, an emergency operation flag is reset to "0" in step S21, and in the following step S22, an ABS flag is reset to "0". Furthermore, in step S23, a low road surface friction coefficient flag is reset to "0" in step S23.

Note that the emergency operation flag is a flag which is set to "1" when the operation switch 41 of the manual operation command switch 23b is depressed with the estimated vehicle body speed VR4R exceeding 2 km/h and which is reset to "0" when the release switch 42 of the manual operation command switch 23b is depressed. The ABS flag is a flag which is set to "1" when there exists a possibility of the rear wheels Wr, Wr being locked through the operation of the electric parking brake system 12 and which is reset to "0" when there exists no such possibility.

The low road surface friction coefficient flag is a flag which is set to "1" when a road surface friction coefficient is small and which is reset to "0" when the road surface friction coefficient is large.

Next, based on the flowcharts shown in FIGS. 11 to 14, an automatic operation routine which is a subroutine of the step S8 in the flowchart in FIG. 9 will be described.

Firstly, in step s31, if the stop determination flag is determined to take "1" and the stop of the vehicle is determined, and in step S32, the gear position detected by the gear position sensor 23e is determined to be in "P" or "N", then, in step S33, an automatic actuation in which the electric parking brake system 12 is automatically actuated is executed. In contrast, in the step S31, if the stop determination flag is determined to take "0" and the stop of the vehicle is not yet determined, and in step S34, if the emergency operation flag is not set to "1", in step S35, an automatic release is executed in which the electric parking brake system 12 is automatically released lest the brake drag should be generated when the electric parking brake system 12 is brought to an operating condition.

In step S32, if the gear position is determined to be neither "P" nor "N", that is, either "D" or "R", and in step S36, if the accelerator pedal is determined to be off or released, and, if a continue-operation flag is determined to take "1" in step S37, if a continue-release flag is determined to take "1" in step S38, or if the brake pedal is determined to be on or depressed in step S39, then, advance to step S40.

Incidentally, once it starts to operate, the electric parking brake system 12 never stops operating halfway through the completion of operation whether the brake pedal is depressed or released thereafter. In addition, once it starts to be released, the electric parking brake system 12 never stops releasing halfway through the completion of releasing whether the brake pedal is depressed or released thereafter. Then, in order that the operation of the electric parking brake system 12 is not stopped halfway through the completion thereof even if the brake pedal is off or released immediately after the vehicle stops, that is, in order to store the fact that the electric parking brake system 12 is in operation, the continue-operation flag is set to "1". In addition, in order that the release of the electric parking brake system 12 is not stopped halfway through the completion thereof even if the brake pedal is on or depressed immediately after the gear position is changed from "P" or "N" to "D" of "R", that is, in order to store the fact that the electric parking brake system 12 is being released, the continue-release flag is set to "1".

Then, with the electric parking brake system 12 being in the middle of operation or release, or with the brake pedal being on or depressed, if the gear position is determined to be "R" in step S40, and if the gradient of the road surface is determined not to be less than –5% in step S41, that is, if the gradient of the downward slope ahead of the vehicle is less steep, since the vehicle is prevented from sliding down forwardly by a creeping force produced in a reverse direction by the "R" position, after the slope judgment timer is reset in step S42, if the continue-release flag is determined to take "1" and the electric parking brake system 12 is determined to be in the midst of being released in step S43, an automatic release of the electric parking brake system 12 is executed (is caused to continue) in step S45. In addition, if the continue-release flag is at "0" and the electric parking brake system 12 is not in the middle of being released in the step S43, and if the previous gear position is determined to be any of the other gear positions than "R" in step S44, that is, if the gear position becomes the "R" position for the first time this time, then, in the step S45, an automatic release of the electric parking brake system 12 is executed. Thus, when there is no risk of the vehicle sliding down forwardly due to the gradient of the road surface being less steep, since the electric parking brake system 12 is automatically released when the position of the gear shifted to becomes the "R" position, the operating effort by the driver is reduced to thereby enable a smooth start from the rest in the reverse direction.

When the gear position is determined not to be the "R" position in the step S40, that is, the gear position is "D", if the gradient of the road surface is determined not to exceed 5% in step S46, that is, if the gradient of the upward slope ahead of the vehicle is less steep, since the vehicle can be prevented from sliding down in the reverse direction by a creeping force generated in a forward direction in the "D" position, after the slope judgment timer is reset in step S47, if the continue-release flag is determined to take "1" and the electric parking brake system 12 is determined to be in the middle of being released in step S48, then, in step S50, an automatic release of the electric parking brake system 12 is executed (continued). In addition, in step S48, if the continue-release flag is determined to take "0" and the electric parking brake system 12 is determined not to be in the middle of being released, and in step S49, if the previous gear position is determined to be any of the other gear positions than "D", that is, if the position of the gear shifted to becomes "D" for the first time this time, an automatic release of the electric parking brake system 12 is executed in the step S50. Thus, when there is no risk of the vehicle sliding down in the reverse direction due to the gradient of the road surface being less steep, since the electric parking brake system 12 is automatically released with the gear shift position becoming "D", the operating effort by the driver can be reduced to thereby enable a smooth start from standstill in the forward direction.

If the gradient of the road surface is determined to be less than −5% in the step S11, or if the gradient of the road surface is determined to exceed 5% in the step S46, that is, if the sliding down of the vehicle cannot be prevented only by the creeping force, the slope judgment timer is counted up in step S51, wait until the slope judgment timer provides a count of 200 msec or longer in step S52, and the electric parking brake system 12 is automatically actuated in step S53, whereby the sliding down of the vehicle can be prevented.

When the stop of the vehicle is not yet determined, or when the brake pedal is off or the accelerator pedal is off while the stop of the vehicle is determined, if the emergency operation flag is determined to take "0" in step S54, if the gear position is determined to be "D" in step S55, if the throttle opening is determined to exceed a release threshold THD in step S56, and in step S57, if the gradient of the road surface is determined not to be smaller than −15% and hence the downward slope ahead of the vehicle is determined not to be extremely steep or the slope ahead of the vehicle is determined to be upward, an automatic release of the electric parking brake system 12 is executed so that the vehicle can start from the rest to move forward in step S58. On the other hand, when the gradient of the road surface is determined to be smaller than −15% and hence the downward slope ahead of the vehicle is determined to be extremely steep in the step S57, execute in step S59 an automatic release 2 in which the electric parking brake system 12 is released slowly so that too quick a start of the vehicle is prevented.

In addition, if the gear position is determined not to be "D" in the step S55, if the gear position is determined to be "R" in step S60, and if the gradient of the road surface is determined not to be larger than 10% and hence the upward slope ahead of the vehicle is determined not to be extremely steep or the slope ahead of the vehicle is determined to be downward in step S62, an automatic release of the electric parking brake system 12 is executed so that the vehicle can start from the standstill to move in the reverse direction in the step 58. On the contrary, when the gradient of the road surface is determined to be larger than 10% and hence the upward slope ahead of the vehicle is determined to be extremely steep in the step S62, execute in step 63 the automatic release 2 in which the electric parking brake system 12 is released slowly so that too quick a start of the vehicle is prevented.

Thus, when the direction of a moving force applied by gravity coincides with the direction of the creeping force due to the vehicle standing on a downward slope and the gear being in the "D" position and the downward slope ahead of the vehicle is extremely steep, since the electric parking brake system 12 is released slowly in the automatic release 2, the vehicle is prevented from abruptly starting from the rest to move forward. Similarly, when the direction of the moving force applied by gravity coincides with the direction of the creeping force due to the vehicle standing on an upward slope and the gear being in the "R" position and the upward slope ahead of the vehicle is extremely steep, since the electric parking brake system 12 is released slowly in the automatic release 2, the vehicle is prevented from abruptly starting from the rest to move backward.

The reason why the throttle opening is compared with the release threshold THD in the steps S56, S61 is as follows. Since the magnitude of the creeping force and the output of the gradient sensor $23i$ scatter, if the electric parking brake system 12 is released only on condition that the brake pedal is off even when the vehicle stands on a gradient ground which is less steep, there exists a possibility that the vehicle moves in the reverse direction. Consequently, the electric parking brake system 12 is released on condition that the accelerator pedal is released and the throttle opening exceeds the release threshold THD.

FIG. 28 shows a map for retrieving a release threshold THD for the throttle opening from the gradient of the road surface. In a case where the vehicle moves forward on a slope which is upward ahead of the vehicle, while the release threshold THD with which the automatic release is executed basically increases linearly as the gradient increases from 0%, the release threshold THD is set smaller than the linear characteristics (refer to a broken line) on a low gradient ground whose gradient ranges from 0% to 10%. To be specific, in an area where the gradient ranges from 0% to 5%, the release threshold is set to 0°, and in an area where the gradient ranges from more than 5% to 10%, the rate of increase of the release threshold THD is set higher in order that the linear characteristics can be restored. Thus, in the area having the gradient ranging from 0% to 5% where there is imposed no risk that the vehicle slides down, that is, when the creeping force produced by the engine exceeds the moving force produced by the gradient of the road surface, the electric parking brake system 12 is released at the same time as the accelerator pedal is depressed, whereby a jerky feeling felt at the time of starting the vehicle from the rest can be eliminated so that a smooth start is enabled. In the area where the gradient ranges from more than 5% to 10%, since the throttle opening with which the electric parking brake system 12 is automatically released increases as the gradient increases, the vehicle can be prevented from moving in the reverse direction when it starts from the standstill.

A release threshold THD map when the gear is in the "R" position provides a characteristic which is inverted relative to the axis of ordinates of the map shown in FIG. 28. In addition, the reason why the absolute value of the threshold of the gradient when the gear is in the "R" position in the step S62 while the absolute value of the threshold of the gradient when the gear is in the "D" position in the step S57 is because the release speed of the electric parking brake system 12 is made slower even on a road surface having a small gradient when the vehicle is started to move in the reverse direction so that the driver can control the vehicle easily since the driver tends to have more difficulty in dealing with an abrupt reverse start than with an abrupt forward start.

Incidentally, in the event that even if the electric parking brake system 12 is actuated, the vehicle slides down due to the braking force of the system being short, the braking force of the electric parking brake system 12 is automatically increased (an automatic pulling force increase) so as to prevent the sliding down of the vehicle. The automatic pulling force increase as referred to herein is not limited to the case where the braking force is increased due to the shortage of braking force occurring while the electric parking brake system 12 is in operation but includes a case where, when the vehicle moves backward due to the gradient of the road surface, the electric parking brake system 12 is changed over from the inoperative condition to the operative condition so as to prevent the reverse movement of the vehicle.

The automatic pulling force increase is such as to be implemented on condition that the stop determination flag is determined to take "1" in step S64, and if the stop determination flag is determined to be reset at "0", the automatic pulling force increase is not implemented, and an accumulated traveling mileage S is reset to 0 in step S65. If the stop determination flag is determined to be set at "1" in the step S65, if any of the four wheel speed sensors 23d . . . is determined to output a wheel speed pulse in step S66, and if the wheel speed pulse so outputted is determined to be a forward rotation (a forward movement) pulse in step 67, then, in step S68, 4 cm is added to the previous value S(n−1) of the accumulated traveling mileage to calculate a current value S of the accumulated traveling mileage. If the wheel speed pulse so outputted is determined to be a reverse rotation (a reverse movement) pulse in the step S67, then, in step S69, 4 cm is subtracted from the previous value S(n−1) of the accumulated traveling mileage to calculate a current value S of the accumulated traveling mileage. The distance of 4 cm is a traveling distance of the vehicle which corresponds to one pulse.

Then, when a gear position detected by the gear position sensor 23e is determined to be "D" in step S70, if the accumulated traveling mileage S is determined to be less than −10 cm in step S71, it is determined that the braking force is short, and an automatic pulling force increase is performed in step S75. In contrast, when the gear is determined not to be in the "D" position in the step S70 but in the "R" position in step S72, if the accumulated traveling mileage S is determined to exceed 10 cm in step S73, that is, if the vehicle travels forward a distance longer than 10 cm, it is determined that the braking force is short, an automatic pulling force increase is performed in the step S75. Furthermore, when the gear is determined not to be in the "R" position in the step S72, that is, when the gear is determined to be in either the "P" or "N" position, if the absolute value of the accumulated traveling mileage S is determined to exceed 10 cm in step S74, that is, if the vehicle travels forward or backward a distance longer than 10 cm, it is determined that the braking force is short, and an automatic pulling force increase is performed in the step S75.

Thus, since the electric parking brake system 12 is actuated when the traveling direction determined by the gear position does not coincide with the actual traveling direction of the vehicle, the vehicle can be prevented from traveling in a direction opposite to an intended direction by the driver in an ensured fashion.

Incidentally, in the event that the gear is shifted to the "R" position immediately before the vehicle which is traveling forward in the "D" position stops, it is determined that the traveling direction based on the gear position does not coincide with the actual traveling direction, resulting in a problem that the electric parking brake system 12 is actuated unnecessarily. According to the embodiment, however, since the aforesaid determination is performed after the stop of the vehicle is determined in the step S64, the unnecessary actuation of the electric parking brake system 12 can be prevented.

Note that the steps S66 to S74 are executed every time each of the four wheel speed sensors 23d . . . provided for the four wheels outputs a wheel speed pulse.

Figure 11:
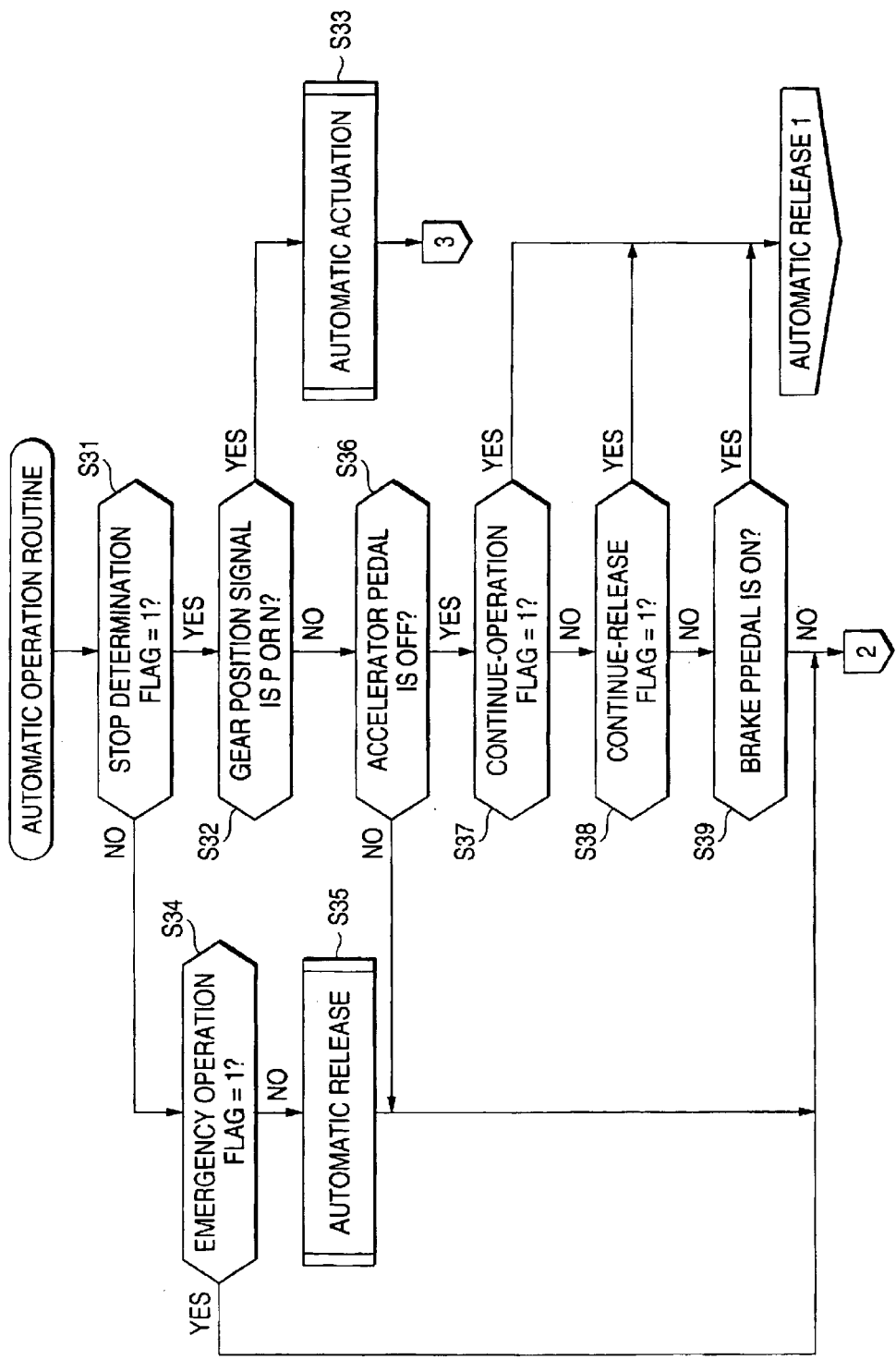
FIG. 11 is a first part of a flowchart of an automatic operation routine.
Figure 12:
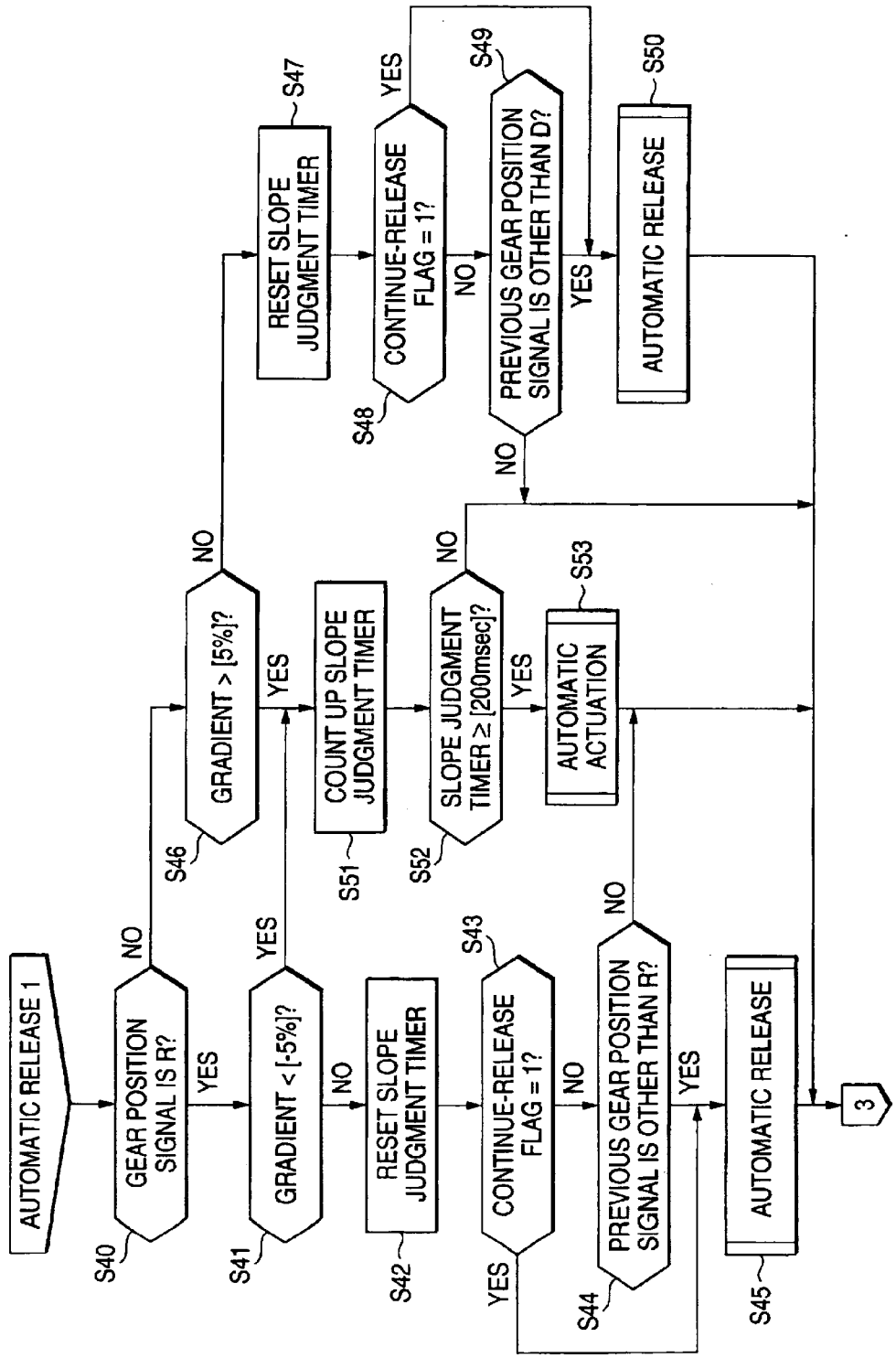
FIG. 12 is a second part of the flowchart of the automatic operation routine.

Next, based on the flowcharts shown in FIGS. 15 and 16, an automatic actuation routine will be described which is a subroutine of the step S33 in the flowchart in FIG. 11 and the step S53 in the flowchart in FIG. 12.

Firstly, in step S81, the automatic release prohibition flag is reset to "0". The reason for this is because, since the automatic actuation is determined to be performed even in the automatic operation mode, the automatic release prohibition flag which is set to "1" in order to prevent the implementation of the automatic release when the operation switch 41 of the manual operation command switch 23b is depressed is reset to "0" here to permit the implementation of the automatic release. The continue-release flag is reset to "0" in the following step S82. The reason for this is because, when the gear is quickly shifted from "N" to "D", then back to "N" with the brake pedal being kept depressed, there may be a case where the electric parking brake system 12 is switched such that an actuation thereof is determined despite the fact that the continue-release flag is set at "1" and the electric parking brake system 12 is in the middle of being released.

If the automatic actuation prohibition flag (which permits the actuation when at "0" while prohibits the actuation at "1") is determined to be at "0" in the following step S83, if an operation mode flag (which indicates "not in operation" when at "0" while indicates "in operation" when at "1" or larger) is determined to be at "0" in step S84, and if an abnormality detection flag (which indicates that the condition is normal when at "0" while indicates the condition is abnormal when at "1") is determined to be at "0", that is, when the actuation of the electric parking brake system 12 is permitted but is not yet done so and the gradient sensor 23i is normal, the target pulling force BfT is set to the first target pulling force BfT1 in step S86. In contrast, when the gradient sensor 23i is determined to be abnormal in the step S85, the target pulling force BfT is set to the third target pulling force BfT3 in step S87.

In the following step S88, a target current TA that is supplied to the electric motor 24 is calculated by the following equation;

TA=(Target Pulling Force BfT)×(Conversion Coefficient a), where the conversion coefficient a is a coefficient for converting a pulling force to current. In the following step S89, the electric motor 24 is driven to rotate forward with a duty ratio of 100% so as to actuate the electric parking brake system 12. If it is determined in the following step S90 that there is no previous actuation operation, that is, if it is determined that an actuation operation is carried out for the first time this time, then, an actuation timer is counted up in step S92 after the timer is reset in step S91. Then, wait until the actuation timer provides a count of longer than 100 msec in step S93, and ignore a surge current generated immediately after the electric motor 24 is energized.

If the current value of the electric motor 24 is determined to reach and exceed the target current TA in the following step S94, then, it is judged that the electric parking brake system 12 produces a required pulling force and completed the operation. Then, the operation mode flag is incremented in step S95, the operation indicator lamp 23k which indicates that the operation of the electric parking brake system 12 is completed is illuminated in step S96, the forward rotation of the electric motor 24 is stopped in step S97, and the continue-operation flag is reset to "0" in step S98.

In contrast, if the current value of the electric motor 24 is determined to be less than the target current TA in the step S94, and if the actuation timer provides a count of less than 3.0 sec in step S95, then, it is judged in step S100 that the electric motor 24 continues to operate, and then the continue-operation flag is reset to "1". Then, if the actuation timer provides a count of 3.0 sec or longer in the step S99, it is inferred that the electric parking brake system 12 cannot be brought to an operation-completed condition due to the Bowden cables 13, 13 being broken. Then, in step S101, a fail safe process is performed during the operation, and move to the step S97 thereafter.

Next, based on the flowchart shown in FIG. 17, an automatic release routine will be described which is a subroutine of the step S35 of the flowchart in FIG. 11, the steps S45, S50 of the flowchart in FIG. 13 and the step S58 of the flowchart in FIG. 13.

Firstly, in step S111, the automatic operation prohibition flag is reset to "0". The reason for this is because since an automatic release is determined to be performed even in the automatic operation mode, the automatic operation prohibition flag, which is set to "1" in order to prevent an automatic operation from being performed when the release switch 42 of the manual operation command switch 23b is switched on, is reset to "0" here so as to permit an automatic operation.

Then, the continue-operation flag is reset to "0" in the following step S112. The reason for this is because, in a case where the gear is shifted to the "D" position immediately after the gear is shifted to the "N" position with, for example, the brake pedal being on, there may occur a case where, when the continue-operation flag is set at "1" and the electric parking brake system 12 is in the middle of operation, a changeover to a release determination takes place.

If the automatic release prohibition flag is determined to be set at "0" and an automatic release of the electric parking brake system 12 is permitted in the following step S113, and if it is determined in step S114 that there is no release operation previously, that is, if it is determined that a release operation takes place for the first time this time, a release timer is then reset in step S115.

If the stroke of the electric parking brake system 12 detected by the stroke sensor 23j (refer to FIG. 2) is determined not to be equal to or less than a 0 position (a release-completed position)+2 mm, the electric motor 24 is driven to rotate in the reverse direction with a duty ratio of 100% in order to release the electric parking brake system 12 in step S117, and the electric parking brake system 12 is thus released. After the release timer is counted up in the following step S118, if the release timer provides a count of less than 3.0 sec in step 119, it is judged in step S120 that the electric parking brake system 12 continues to be released, and the continue-release flag is set to "1". Then, if the release timer provides a count of 3.0 sec or longer in the step s119, it is inferred that the drive system of the electric parking brake system 12 gets frozen and hence a release-completed condition cannot be attained, and a fail safe process is executed in the middle of release in step S121.

If the stroke is determined to be equal to or less than the 0 position (the release-completed position)+2 mm in the step S116, it is judged that the release is completed, and the operation mode flag is reset to "0" in step S122, the operation indicator lamp 23k is turned off in step S123, the electric motor 24 is suppressed from being driven to rotate in the reverse direction in step S124, and the continue-release flag is reset to "0" in step S125. Note that the reason why the electric motor 24 continues to be driven to rotate in the reverse direction until the stroke reaches 2 mm before the 0 position is to stop the electric motor 24 at the 0 position in consideration of the fact that the electric motor 24 continues to rotate for some time due to inertia even after feeding is stopped.

Next, based on the flowchart in FIG. 18, an automatic release 2 routine will be described which is a subroutine of the steps S59, S63 of the flowchart in FIG. 13.

Firstly, the automatic operation prohibition flag is reset to "0" instep S131. The reason for this is because since the automatic release is determined to be performed even in the automatic operation mode, the automatic operation prohibition flag, which is set to "1" in order to prevent an automatic operation from being performed when the release switch 42 of the manual operation command switch 23b is switched on, is reset to "0" here so as to permit an automatic operation. Then, the continue-operation flag is reset to "0" in the following step S112. The reason for this is the same as that described with the automatic release routine that is described previously.

If the automatic release prohibition flag is determined to be set at "0" and an automatic release of the electric parking brake system 12 is permitted in the following step S133, and if it is determined in step S134 that there is no release 2 operation previously, that is, if it is determined that a release 2 operation takes place for the first time this time, a release timer is then reset in step S135.

If the stroke of the electric parking brake system 12 detected by the stroke sensor 23j is determined not to be equal to or less than the 0 position (the release-completed position)+2 mm, the electric motor 24 is driven to rotate slowly in the reverse direction with a duty ratio of 50% (half the duty ratio used for the automatic release described by reference to FIG. 17) in order to release the electric parking brake system 12 in step S137, and the electric parking brake system 12 is thus released. After the release timer is counted up in the following step S138, if the release timer provides a count of equal to or longer than 2.0 sec in step 139, it is inferred that the release-completed condition cannot be attained due to a shortage of power that is supplied to the electric parking brake system 12, an automatic release is executed in step S140 in which the electric motor 24 is driven to rotate in the reverse direction with the duty ratio of 100% (refer to the flowchart shown in FIG. 17).

If the stroke is determined to be equal to or less than the 0 position (the release-completed position)+2 mm in the step S136, it is judged that the release is completed, and the operation mode flag is reset to "0" in step S141, the operation indicator lamp 23k is turned off in step S142, and the electric motor 24 is suppressed from being driven to rotate in the reverse direction in step S143. Note that the reason why the electric motor 24 continues to be driven to rotate in the reverse direction until the stroke reaches 2 mm before the 0 position is to stop the electric motor 24 at the 0 position in consideration of the fact that the electric motor 24 continues to rotate for some time due to inertia even after feeding is stopped.

Next, based on the flowcharts in FIGS. 19 and 20, an automatic pulling force increase routine will be described which is a subroutine of the step S75 of the flowchart shown in FIG. 14.

Firstly, in step S151, the automatic release prohibition flag is reset to "0". The reason for this is because, since the automatic actuation (an automatic pulling force increase) is determined to be performed even in the automatic operation mode, the automatic release prohibition flag which is set to "1" in order to prevent the implementation of the automatic release when the operation switch 41 of the manual operation command switch 23b is depressed is reset to "0" here to permit the implementation of the automatic release. The continue-release flag is reset to "0" in the following step S152. The reason for this is because, there may be a case where the vehicle moves in the reverse direction due to the gradient of the road surface when the continue-release flag is set at "1" and the electric parking brake system 12 is in the middle of being released, whereby the automatic pulling force increase is needed.

If the automatic actuation prohibition flag is determined to be set at "0" to thereby permit an automatic operation in the following step S153, and if a gradient sensor 23i abnormality detection flag is determined to take "0" to thereby indicate that the gradient sensor 23i is normal in step S154, the target pulling force BfT is set to the first target pulling force BfT1 in step S155. In contrast, if the gradient sensor 23i abnormality detection flag is determined to be set at "1" to indicate that the gradient sensor 23i is abnormal in the step S154, the target pulling force BfT is set to the third target pulling force BfT3 in step S156.

In the following step S157, a target current TA that is supplied to the electric motor 24 is calculated by the following equation;

TA=(Target Pulling Force BfT)×(Conversion Coefficient a) and in step s158, the electric motor 24 is driven to rotate forward with a duty ratio of 100% so as to increase the pulling force of the electric parking brake system 12. If it is determined in the following step S159 that there is no previous pulling force increase operation, that is, if it is determined that a pulling force increase operation is carried out for the first time this time, then, the actuation timer is counted up in step S161 after the timer is reset in step S160. Then, wait until the actuation timer provides a count of longer than 100 msec in step S162, and ignore a surge current generated immediately after the electric motor 24 is energized.

If the current value of the electric motor 24 is determined to reach and exceed the target current TA in the following step S163, then, it is judged that the electric parking brake system 12 produces a required pulling force and completed the pulling force increase. Then, the operation mode flag is incremented in step S164, the operation indicator lamp 23k which indicates that the pulling force increase of the electric parking brake system 12 is completed is illuminated in step S165, the forward rotation of the electric motor 24 is stopped in step S166, and the accumulated traveling mileage S is reset in step S167.

In contrast, if the current value of the electric motor 24 is determined to be less than the target current TA in the step S163, and if the actuation timer provides a count of 3.0 sec or longer in the step S168, it is inferred that the electric parking brake system 12 cannot be brought to a pulling force increase-completed condition due to the Bowden cables 13, 13 being broken. Then, in step S169, a fail safe process is performed during the operation.

Next, based on the flowcharts in FIGS. 21 to 23, a manual operation routine will be described which is a subroutine of the step S9 of the flowchart in FIG. 9.

Firstly, in step S171, the rise of a pulse signal generated when the operation switch 41 of the manual operation command switch 23b, which is of a self-return type, is detected as an operation command. As this occurs, a signal in a high-level condition generated after the pulse signal rises is not detected as an operation command, whereby even if a failure in which the operation switch 41 of the manual operation command switch 23b is stuck is caused, the electric parking brake system 12 can be released by giving priority to the operation of the release switch 42 of the manual operation command switch 23b, thereby making it possible to avoid a risk that the release of the electric parking brake system 12 becomes impossible due to the operation switch 41 sticking to ON.

A release command flag is reset to "0" in the following step S172, the command level flag is incremented in step S173, the ABS flag and the low road surface friction coefficient flag are reset to "0" in step S174. On the other hand, when the release switch 42 of the manual operation command switch 23b is depressed in step S175, the command level flag is reset to "0" in step S176, the emergency operation flag is reset to "0" in step S177, and move to the step S174 after the release command flag is reset to "1" in step S178.

Note that the command level flag only functions as an operation command flag within an area of the estimated vehicle body speed VR4R<2 km/h and is reset to "0" when the operation of the electric parking brake system 12 is completed. In addition, within an area of the estimated vehicle speed VR4R≧2 km/h, in addition to the function as the operation command flag, the command level flag functions as a parameter for determining the target deceleration Gt, whereby as long as the release switch 42 of the manual operation command switch 23b is not depressed, the command level flag is not reset to "0".

In the following step S179, if the release command flag is determined to be set at "0", then, in step S180, the following four parameters are calculated.

A first parameter is the estimated vehicle body speed VR4R and is calculated as a maximum value of wheel speeds of the four wheels. Since there is a possibility that any of the four wheels is brought to a locked condition due to the operation of the electric parking brake system 12, all the wheel speeds are taken in to select a maximum wheel speed among the wheel speeds so taken in.

A second parameter is the vehicle body deceleration GRF and is calculated as a mean value of {current value FRVw (n) of the right front wheel speed−previous value FRVw (n−1) of the right front wheel speed}/dt and {current value FLvw (n) of the left front wheel speed−the previous value FLVw (n−1) of the left front wheel speed}/dt, that is, a mean value the acceleration of the left and right front wheels}/dt. Since there exists a possibility that the rear wheels Wr, Wr are locked due to the operation of the electric parking brake system 12, the wheel speed calculation is started from the front wheels. In addition, since there is caused a difference in the wheel speed of the left and right front wheels when taking a turn, a mean value of the values calculated from the left and right front wheels is adopted.

A third parameter is a front wheel estimated vehicle body speed VRF or the estimated vehicle body speed at the front wheels and is calculated as a low-select value of wheel speeds FRVw, FLVw of the left and right front wheels. The front wheel estimated vehicle body speed VRF is prevented from becoming larger than an actual value when turning by adopting the low-select value.

A fourth parameter is rear wheel acceleration and deceleration and is calculated as a low-select value of acceleration and deceleration of the left and right rear wheels Wr, Wr (one having a larger deceleration). The detection of locking of the rear wheels Wr, Wr can be ensured by adopting the low-select value.

In the following step S181, if the command level flag is determined to take "1" or larger and if an operation command is determined to be issued from the operation switch 41 of the manual operation command switch 23b, and if the estimated vehicle body speed VR4R is determined to be less than 2 km/h in step S182, that is, if the vehicle is determined to be substantially stationary, the target deceleration Gt is reset to 0.0 G in step S183, and a manual operation is executed in step S184. As this occurs, the target pulling force BfT is any of the first target pulling force BfT1, the second target pulling force BfT2 and the third target pulling force BfT3. In addition, if the release command flag is determined to take "1" and if a release command is determined to be issued from the release switch 42 of the manual operation command switch 23b in the step S179, the target deceleration Gt is reset to 0.0 G in step 185, and a manual release is executed in step S186.

In the step S182, if the estimated vehicle body speed VR4R is determined to be equal to or larger than 2 km/h, that is, if the vehicle is determined to be running, a target deceleration Gt according to the then condition of the vehicle is set. Namely, if the low road surface friction coefficient flag is determined to take "0" and hence the road surface friction coefficient is determined to be in a high condition in step S187, the operation switch 41 of the manual operation command switch 23b is determined to be kept depressed and hence the output therefrom is determined to be at a high level in step S188, and if the vehicle body deceleration GRF is determined to be equal to or smaller than the target deceleration Gt in step S189, the target deceleration Gt is updated by the then vehicle body deceleration GRF in step S190. As this occurs, the target deceleration Gt is limited to a range from −0.15 G to −0.30 G. −0.30 G is a maximum deceleration that the rear wheels can produce on a dry asphalt-finished road.

On the other hand, if the operation switch 41 of the manual operation command switch 23b is not determined to be kept depressed in the step S188, and the vehicle body deceleration GRF is determined not to be equal to or smaller than 2 km/h in the step S189, a target deceleration Gt is calculated from an equation; Command level×(−0.15 G) in step S191. In this case, too, the target deceleration Gt is limited to the range from −0.15 G to −0.30 G. Furthermore, if the low road surface friction coefficient flag is determined to take "1" and the road surface friction coefficient is determined to be in a low condition in the step S187, rear wheel acceleration and deceleration RrG≦0.0 G, the rear wheel acceleration and deceleration being referred to later on, and the target deceleration Gt is basically not updated except for a case where the target deceleration Gt is set to the vehicle deceleration GRF×90%. Then, the emergency operation flag is set to "1" in step S192.

It is an emergency operation which actuates the electric parking brake system 12 so as to brake the vehicle when the service brake fails while the vehicle is running, and the emergency operation flag has a role of making the flow of the automatic operation mode bypassed when the automatic operation mode is selected and is not reset to "0" when the release switch 42 of the manual operation command switch 23b is depressed or the brake pedal becomes on, whereby the brake fluid pressure becomes equal to or larger than 1 MPa (refer to the step S21 in FIG. 10).

In the following step S193, if a value obtained by subtracting the low-select value of the wheel speeds of the left and right rear wheels Wr, Wr from the front wheel estimated vehicle body speed VRF is determined to be equal to or larger than 2 km/h, it is judged that the rear wheels Wr, Wr tend to be locked due to the road surface friction coefficient being small, and in step S194, the low road surface friction coefficient flag is set to "1". The reason why the low-select value of the wheel speeds of the left and right rear wheels Wr, Wr is to ensure the detection of the locked rear wheels Wr, Wr. In the following step S195, if the rear wheel deceleration RrG is determined to be equal to or smaller than 0.0 G, that is, if the wheel speeds of the rear wheels Wr, Wr are decreasing, it is judged that there exists a possibility that the rear wheels are locked, and in order to prevent the locking of the rear wheels Wr, Wr, the target deceleration Gt is calculated by the vehicle deceleration GRF×90%. As this occurs, the target deceleration Gt so calculated is limited to a range ranging from −0.10 G to −0.30 G.

In the following step S197, the ABS flag, which indicates that an ABS (anti-lock braking system) control is being executed, is set to "1", and a continuation timer (500 msec in the embodiment) is reset in step S198. Note that once set to "1", the low road surface friction coefficient flag and the ABS flag are not reset to "0" in any case until the operation switch 41 of the release switch 42 of the manual operation command switch 23b is depressed (refer to the step S174 in the flowchart in FIG. 21) or the stop of the vehicle is determined. The ABS flag is, however, reset to "0" when the 500 msec of the continuation timer elapses (refer to step S207 in the flowchart in FIG. 23).

In the following step S199, if the stroke of the electric parking brake system 12 is determined to exceed the 0 position+2 mm, the electric motor 24 is driven to rotate in the reverse direction so as to reduce the braking force to thereby suppress the locking of the rear wheels Wr, Wr in step S200. Then, in the step S199, if the stroke is determined to be less than the 0 position+2 mm, in order to prevent an excessive return, the reverse rotation of the electric motor 24 is stepped in step S204.

In the step S193, if the value obtained by subtracting the low-select value of the wheel speeds of the left and right rear wheels Wr, Wr from the front wheel estimated vehicle body speed VRF is determined to be less than 2 km/h and even if the rear wheels Wr, Wr are determined not to tend to be locked, if the vehicle body deceleration GRF<−0.4 G in step S201, it is judged that the braking force is excessive, and the steps S195 to S200 and steps S203, S204 are executed so as to reduce the braking force of the electric parking brake system 12. Thus, by setting the upper limit value of the vehicle body deceleration GRF to −0.4 G, the prevention of locking of the rear wheels Wr, Wr can be ensured, whereby the vehicle behaviors are attempted to be stabilized. In particular, since the magnitude of braking force generated in the electric parking brake system 12 is controlled not on the current value of the electric motor 24 and the stroke amount of the electric parking brake system 12 but on the vehicle body deceleration GRF, the magnitude of braking force can be controlled accurately irrespective of the temperature and wear conditions of the brake shoes 15, 16, whereby the locking of the rear wheels Wr, Wr can be prevented in an ensured fashion.

If vehicle body deceleration GRF≧−0.4 G in the step S201, and if the vehicle body deceleration GRF<target deceleration Gt and hence the braking force is determined to be excessive in step S202, the continuation timer is reset and the forward rotation of the electric motor 24 is stopped in order to prevent the braking force from becoming excessive in step S203. The reason why the continuation timer is reset in the step S203 is because there exists a case where the electric motor 24 is re-driven to rotate forward from vehicle body deceleration GRF≧target deceleration Gt which is re-established after the forward rotation of the electric motor 24 is stopped from vehicle body deceleration GRF<target deceleration Gt which is established before 500 msec, which is time set on the continuation timer, elapses.

Vehicle body deceleration GRF≧target deceleration Gt and hence the braking force is determined to be short in the step S202, the continuation timer is counted up in step S205. Then, in the following step S206, if the continuation timer provides a count which exceeds 500 msec, the ABS flag is reset to "0" in step S207. Namely, that the braking force is increased by rotating the electric motor 24 forward so as to compensate for the shortage of braking force means that there exists no possibility that the rear wheels Wr, Wr are locked, and wait until 500 msec elapses and the ABS flag is then reset to "0".

If the ABS flag is determined to take "1" in step S208, the duty ratio of the electric motor 24 is set to less than 100% in step S209. In contrast, if the ABS flag is determined to take "0" in the step S208, the duty ratio of the electric motor 24 is set to 100%. Then, the electric motor 24 is driven to rotate forward based on the respective duty ratios in step S210 to thereby increase the braking force of the electric parking brake system 12.

As is described heretofore, when the vehicle body deceleration GRF is equal to or larger than the target deceleration Gt and hence the braking force is determined to be short, and the ABS flag is set to "1", the electric motor 24 is driven to rotate forward with the duty ratio of less than 100%, whereby the braking force is increased slowly so that the vehicle body deceleration reaches the target deceleration Gt. Then, if the vehicle body deceleration GRF does not reach the target deceleration Gt even after 500 msec elapses, since it is considered that there exists a condition where the braking force is difficult to be attained due to the overheat of the brake shoes 15, 16 of the electric parking brake system 12, then, the ABS flag is reset to "0" so that the electric motor 24 is driven with the duty ratio of 100% to thereby increase the braking force.

Next, based on the flowcharts shown in FIGS. 24 and 25, a manual actuation routine will be described which is a subroutine of the step S184 of the flowchart in FIG. 22.

Firstly, if an automatic release of the electric parking brake system 12 is determined in step S221, then, the automatic release prohibition flag is set to "1" so that an automatic release is prohibited. Namely, the automatic release prohibition flag is set to "1" to prohibit an automatic release in the event that the operation switch 41 of the manual operation command switch 23b is depressed when the automatic operation mode is selected and the automatic release is determined to be performed in the automatic operation mode.

In the following step S223, the automatic operation prohibition flag, which is set to "1" when the release switch 42 of the manual operation command switch 23b is depressed, is reset to "0". In addition, since the operation switch 41 of the manual operation command switch 23b may happen to be depressed in the midst of the actuating operation in the flowchart shown in FIG. 16 or in the midst of a releasing operation in the flowchart shown in FIG. 17, the continue-operation flag and the continue-release flag are reset to "0".

In the following step S224, if the stop determination flag is determined to be set at "1" and hence the stop is determined, and if the abnormality detection flag is determined to be reset at "0" in step S225 and hence the gradient sensor 23i is determined to be normal, the target pulling force BfT is set to the first target pulling force BfT1 in step S226. If the stop determination flag is determined to be reset at "0" and hence the stop is not yet determined in the step S224, the target pulling force BfT is set to the second target pulling force BfT2 in step S227. If the abnormality detection flag is determined to be set at "1" and hence the abnormality sensor 23j is determined to be abnormal in the step S225, the target pulling force BfT is set to the third target pulling force BfT3 in step S228.

In the following step S229, the target current TA that is supplied to the electric motor 24 is calculated by the following equation;

TA=(Target Pulling Force BfT)×(Conversion Coefficient a), and in step 230, the electric motor 24 is driven to rotate forward with a duty ratio of 100% so as to actuate the electric parking brake system 12. If it is determined in the following step S231 that there is no previous actuation operation, that is, if it is determined that an actuation operation is carried out for the first time this time, then, an actuation timer is counted up in step S233 after the timer is reset in step S232. Then, wait until the actuation timer provides a count of longer than 100 msec in step S234, and ignore a surge current generated immediately after the electric motor 24 is energized.

If the current value of the electric motor 24 is determined to reach and exceed the target current TA in the following step S235, then, it is judged that the electric parking brake system 12 produces a required pulling force and completed the operation. Then, the operation mode flag is incremented in step S236, the operation indicator lamp 23k which indicates that the operation of the electric parking brake system 12 is completed is illuminated in step S237, the forward rotation of the electric motor 24 is stopped in step S238, and the command level flag is reset to "0" in step S239.

In contrast, if the current value of the electric motor 24 is determined to be less than the target current TA in the step S235, and if the actuation timer provides a count of equal to or longer than 3.0 sec in step S240, then, it is inferred that the electric parking brake system 12 cannot be brought to an operation-completed condition due to the Bowden cables 13, 13 being broken. Then, in step S241, a fail safe process is performed during the operation.

Note that when the actuation timer provides a count of less than 3.0 sec in the step S240, as long as the release switch 42 of the manual operation command switch 23b is not depressed, there is no factor which interrupts the actuating operation before the actuation is completed, and therefore, the continue-operation flag is not set to "1" as done in step S100 in the flowchart shown in FIG. 16.

Next, based on the flowchart shown in FIG. 26, a manual release routine will be described which is a subroutine of the step S186 in the flowchart shown in FIG. 22.

Firstly, in step S251, if an automatic operation of the electric parking brake system 12 is determined, the automatic operation prohibition flag is set to "1" to prohibit an automatic operation. Namely, in the event that the release switch 42 of the manual operation command switch 23b is depressed when the automatic operation is determined in the automatic operation mode, the automatic operation prohibition flag is set to "1" to prohibit an automatic operation in order to enable a manual release.

In the following step S253, the automatic release prohibition flag, which is set to "1" when the operation switch 41 of the manual operation command switch 23b is depressed, is reset to "0". In addition, since the operation switch 41 of the manual operation command switch 23b may happen to be depressed in the midst of the actuating operation in the flowchart shown in FIG. 16 or in the midst of a releasing operation in the flowchart shown in FIG. 17, the continue-operation flag and the continue-release flag are reset to "0".

In the following step S254, if it is determined that there is no previous release operation, that is, if it is determined that a release operation is performed for the first time this time, the release timer is reset in step S255. In the following step S256, if the stroke of the electric parking brake system 12 is determined not to be equal to or smaller than the 0 position+2 mm, then, the electric motor 24 is driven to rotate in the reverse direction with the duty ratio of 100% in step S257, and the release timer is counted up in step S258. If the release timer provides a count of 3.0 sec or longer in step S259, a fail safe process is executed in the midst of release.

In contrast, if the stroke of the electric parking brake system 12 is determined to be equal to or smaller than the 0 position+2 mm in the step S256, then, the operation mode flag is reset to "0" in step S261, and the operation indicator lamp 23k is turned off. Thus, when the electric parking brake system 12 is released, or the fail safe process is executed in the midst of release, the electric motor 24 is prevented from being driven to rotate in the reverse direction in step S263, and the release command flag is reset to "0" in step S264.

Next, referring to the timing diagram shown in FIG. 29, a function will be described specifically which results when the operation switch 41 of the manual operation command switch 23b is depressed while the vehicle is running.

When the operation switch 41 of the manual operation command switch 23b is depressed at position a while the vehicle is running at a vehicle speed of 2 km/h or faster, the target deceleration Gt is set to −0.15 G in response to the command level flag="1" (refer to the step S191 in the flowchart in FIG. 22), and the electric motor 24 of the electric parking brake system 12 is energized in order to generate a deceleration of −0.15 G. While a surge current flows at position b at that moment, thereafter, the current value of the electric motor 24 gradually increases as the tension of the Bowden cables 13, 13 increases, and in conjunction with this, the stroke of the electric parking brake system 12 gradually increases to thereby generate the braking force. As a result, the vehicle body deceleration gradually increases, and when the vehicle body deceleration GRf<−0.15 G at position d soon, energizing the electric motor 24 is stopped.

When the driver requests a further deceleration and then depresses the operation switch 41 of the manual operation command switch 23b again at position e, the target deceleration Gt is set to −0.30 G in response to the command level flag="2", and the electric motor 12 of the electric parking brake system 12 is re-energized in order to produce a deceleration of −0.30 G. While a surge current flows at position f at that moment, thereafter, as the tension of the Bowden cables 13, 13 increases at position g, the current value of the electric motor 24 gradually increases, and in parallel with this, the stroke of the electric parking brake system 12 gradually increases, whereby the braking force is increased. As a result, the vehicle body deceleration GRF decreases further, and if the vehicle body deceleration <−0.30 G soon at position h, energizing the electric motor 24 is stopped.

While the process is being performed, the wheel speed Vw (the low-select value of the wheel speeds of the left and right rear wheels Wr, Wr) gradually decreases, and when, judging that no further deceleration is needed, the driver depresses the release switch 42 of the manual operation command switch 23b at position I, the target deceleration Gt is reset to 0.0 G. Then, the stroke of the electric parking brake system 12 is reduced by rotating the electric parking brake system 12 in the reverse direction at position j, and energizing the electric motor 24 is stopped so that the stroke comes back to the 0 position at position k. As this occurs, since the rotational direction of the electric motor 24 is a reverse direction which is biased by virtue of the tension of the Bowden cables 13, 13, the current value of the electric motor 24 at the position j becomes smaller than current values at the positions c and g where the electric motor 24 rotates forward.

Thus, since the electric parking brake system 12 can be brought into operation by depressing the operation switch 41 of the manual operation command switch 23b in the event that the service brake fails while the vehicle is running, the vehicle can be decelerated and brought to a halt without using the service brakes. In addition, since the target deceleration Gt increases as the number of times of depressing the operation switch 41 increases, the vehicle can be decelerated at a deceleration required by the driver.

Moreover, since the braking force of the electric parking brake system 12 is controlled not based on the stroke of the electric parking brake system 12 and the current value of the electric motor 24 but based on the target deceleration Gt of the vehicle, a desired deceleration can be obtained without being affected by the temperature and wear conditions of the brake shoes 15, 16 of the parking brakes 11, 11.

Next, referring to the timing diagram shown in FIG. 30, a function will be described specifically which results when the operation switch 41 of the manual operation command switch 23b is kept depressed when the vehicle is running.

When the operation switch 41 of the manual operation command switch 23b is depressed at position a while the vehicle is running at a vehicle speed of 2 km/h or faster, the target deceleration Gt is set to −0.15 G in response to the command level flag="1", and the electric motor 24 of the electric parking brake system 12 is energized in order to generate a deceleration of −0.15 G. While a surge current flows at position b at that moment, thereafter, the current value of the electric motor 24 gradually increases as the tension of the Bowden cables 13, 13 increases, and in conjunction with this, the stroke of the electric parking brake system 12 gradually increases to thereby generate the braking force.

Even if the vehicle body deceleration GRF≦0.15 G at position d, in the event that the operation switch 41 is kept depressed, the target deceleration Gt is updated by the current vehicle body deceleration GRF at position e (refer to the step S190 of the flowchart in FIG. 22). As result, with the target deceleration Gt<−0.15 G, the braking force is increased further.

Soon after this occurs, if the vehicle body deceleration GRF decreases to −0.30 G, which is a lower limit deceleration, at position f, energizing the electric motor 24 is stopped and the braking force is held thereat. Note that even if the driver releases the operation switch 41 of the manual operation command switch 23b at position g after the position d, the braking control continues.

When the vehicle body deceleration GRF which is switched to increase soon after energizing the electric motor 24 is stopped becomes GRF>−0.30 G at position h, the electric motor 24 is re-energized at position i so as to increase the braking force, and when the vehicle body deceleration GRF becomes GRF≦−0.30 G again at position j, energizing the electric motor 24 is stopped.

Thereafter, if the vehicle body deceleration GRF undershoots to become GRF≦−0.4 G (an upper limit value of the deceleration), and if the number of rotations of the rear wheels Wr, Wr decreases at the rear wheel acceleration and deceleration RrG≦0.0 G, the target deceleration is set to 90% of the vehicle body deceleration GRF (refer to the steps S201, S195, s196 of the flowchart in FIG. 23), and the electric motor 24 is driven to rotate in the reverse direction at position 1 so as to reduce the braking force. Then, when the rear wheel acceleration and deceleration RrG≧0.0 G results at position m, so that the number of rotations of the rear wheels Wr, Wr turns to increase, the electric motor 24 is suppressed from being driven to rotate in the reverse direction.

As is described heretofore, since the electric parking brake system 12 can be brought into operation by continuing to depress the operation switch 41 of the manual operation command switch 23b in the event that the service brake fails while the vehicle is running, the vehicle can be decelerated and brought to a halt without using the service brakes. In particular, since the target deceleration Gt is gradually increased by continuing to depress the operation switch 41, the vehicle can effectively be decelerated by generating the braking force to its maximum extent. As this occurs, since the braking force is decreased when the target deceleration Gt≦−0.4 G (the upper limit value of the deceleration) results, the rear wheels Wr, Wr can be prevented from being locked with an excessive braking force.

In addition, since the braking force of the electric parking brake system 12 is increased by depressing intermittently or continuously the operation switch 41 of the manual operation command switch 23b, in the event that, for example, the driver detects the road conditions ahead and judges that an increase in braking force is needed, an effective braking effect can be obtained by increasing the braking force arbitrarily by operating the operation switch 41.

Next, referring to the timing diagram shown in FIG. 31, a function will be described specifically which results when the operation switch 41 of the manual operation command switch 23b is depressed intermittently while the vehicle is running on a road surface whose road surface friction coefficient is small.

When the operation switch 41 of the manual operation command switch 23b is depressed continuously twice at position a while the vehicle is running at the vehicle speed of 2 km/h, the target deceleration Gt decreases from 0.0 G to 0.15 g then to 0.30 G, and the electric motor 24 is driven to rotate forward at position b in order to generate a braking force on the electric parking brake system 12. As a result, the rear wheels Wr, Wr are braked, and a deviation between the front wheel estimated vehicle body speed VRF and the wheel speed Vw (a low-select value of the wheel speeds of the left and right rear wheels Wr, Wr) increases gradually, and when the deviation reaches and exceeds a slip amount regulating value (2 km/h in the embodiment) at position c (refer to the step s193 of the flowchart shown in FIG. 23), it is judged that the rear wheels Wr, Wr tend to be locked due to the road surface friction coefficient being small, and updating is performed without interruptions such that the target deceleration becomes 90% of the vehicle body deceleration at position d.

In general, a maximum braking force generates in a condition where the wheels slightly slip, and therefore, there exists a high possibility that the vehicle body deceleration GRF resulting while the possibility of wheel locking is being judged is a maximum vehicle body deceleration GRF that is generated on that road surface. Consequently, by setting the target deceleration Gt resulting when there exists the possibility of wheel locking to (90% of the vehicle body deceleration GRF in the embodiment) based on the aforesaid vehicle body deceleration GRF, a maximum braking force can be obtained while preventing the occurrence of wheel locking. Moreover, a stable deceleration feeling can be obtained and adverse effects on the durability of the electric parking brake system 12 can be suppressed to a minimum level by preventing the repetition of increase and decrease in braking force of the electric parking brake system 12.

Then, in order to generate a set target deceleration Gt at position d, the electric motor 24 is driven to rotate in the reverse direction at position e to reduce the braking force to thereby restore the wheel speed Vw, whereby the generation of locking is prevented. Then, when the rear wheel acceleration and deceleration is restored such that the rear wheel acceleration and deceleration RrG≧0.0 G at position f, it is judged that the possibility that wheel locking is caused is eliminated, and the electric motor 24 is suppressed from being driven to rotate in the reverse direction so as to hold the braking force. As this occurs, instead of judging the elimination of the possibility that wheel locking is caused when the rear wheel acceleration and deceleration is restored such that the rear wheel acceleration and deceleration RrG0.0 G≧0.0 G, it may be judged that the possibility of generation of wheel locking is eliminated when the deviation between the front wheel estimated vehicle body speed VRF and the wheel speed Vw becomes less than the slip amount regulating value.

The wheel speed Vw is gradually restored by reducing the braking force, and the deviation between the front wheel estimated vehicle body speed VRF and the wheel speed Vw becomes less than the slip amount regulating value at position g, and if the vehicle body deceleration GRF≧the target deceleration Gt, in order to obtain the target deceleration Gt, the electric motor 24 is driven to rotate forward so as to increase the braking force at position h. However, the duty ratio of the electric motor 24 when this occurs is not 100%, and by setting the duty ratio smaller than 100%, the braking force is increased slowly (refer to the step S209 of the flowchart shown in FIG. 23). Then, by increasing the braking force slowly, the overshoot of the vehicle body deceleration GRF can be prevented which occurs when the vehicle body deceleration GRF exceeds the target deceleration Gt, whereby not only a stable deceleration can be obtained but also the adverse effect on the durability of the electric parking brake system 12 can be suppressed to a minimum level.

Then, when the vehicle body deceleration GRF<the target deceleration Gt is realized at position h, the electric motor 24 is suppressed from being driven to rotate forward in order that the braking force is increased further.

As is described above, since the anti-lock brake control is performed which is similar to that performed with the service brakes when the electric parking brake system 12 is actuated to brake the vehicle in case the service brake fails, the braking force can be obtained to its maximum extent while attempting to stabilize the vehicle behaviors by preventing the locking of the rear wheels Wr, Wr.

Thus, while the embodiment of the invention is described in detail heretofore, the invention may be modified in various ways with reference to design without departing from the spirit and scope thereof.

For example, while the target deceleration Gt is decreased by replacing the current vehicle body deceleration GRF by the target deceleration Gt in the event that the operation switch 41 of the manual operation command switch 23b continues to be depressed in the embodiment, the target deceleration Gt may be decreased by a predetermined amount every time a predetermined length of time elapses since the operation switch 41 is depressed.

Thus, according to the first aspect of the invention, since the braking force of the parking brake is controlled such that the vehicle is decelerated at the target deceleration of the predetermined magnitude when the driver attempts to brake the running vehicle by issuing the operation command to operate the parking brake, even in case the temperature and degree of wear of the friction material of the parking brake vary, the vehicle can be decelerated at the target deceleration at all times, thereby making it possible to obtain a stable brake effect that is free from being affected by the conditions of the friction material.

According to the second aspect of the invention, since the operation command of the parking brake is issued based on the operation of the operating member by the driver, the braking that matches the intention of the driver can be attained. In addition, since the magnitude of the target deceleration can be set based on the amount of operation of the operating member, the generation of a deceleration demanded by the driver can be ensured.

According to the third aspect of the invention, since, when the switch constituting the operating member is operated to change over from the non-command position to the operation command position, the magnitude of the target deceleration is set according to the number of changeovers of the switch, and when the switch continues to be held at the operation command position after the vehicle body deceleration is increased to the target deceleration, the target deceleration is increased, the magnitude of vehicle body deceleration can arbitrarily be controlled as the driver intends.

For example, while the upper limit value of the vehicle body deceleration GRF is set to −0.4 G in the embodiment, the value may be altered as required.

According to the forth aspect of the invention, in attempting to brake the running vehicle by issuing the operation command to actuate the parking brake by the driver, since the operation of the parking brake can be controlled such that the vehicle body deceleration does not exceed the upper limit value set in advance, locking of the rear wheel can be prevented by accurately regulating the maximum value for the vehicle body deceleration to the predetermined magnitude irrespective of the temperature and degree of wear of the friction material of the parking brake.

What is claimed is:

1. An electric parking brake system comprising:

a parking brake, and an electric motor, wherein the parking brake is activated by the electric motor, and operation of the parking brake is controlled such that a vehicle is decelerated at a target deceleration of a predetermined magnitude when an operation command to operate the parking brake is issued by a driver while the vehicle is running, the operation command is issued based on the operation of an operating member by the driver, and the predetermined magnitude of the target deceleration is set based on an amount of operation of the operating member, wherein the operating member comprises a switch which changes over from a non-command position to an operation command position when depressed by the driver and which is held at the operation command position only while kept depressed by the driver, a number of changeovers from the non-command position to the operation command position constitutes the amount of operation, and when the switch continues to be situated at the operation command position even after a vehicle body deceleration increases to the target deceleration, the target deceleration is increased.

2. The electric parking brake system of claim 1, wherein an upper limit value for the target vehicle body deceleration is also set in advance, and operation of the parking brake is controlled such that the vehicle body deceleration does not exceed the upper limit value so set when the operation command to operate the parking brake is issued by a driver while the vehicle is running.

* * * * *

UNITED STATES PATENT AND TRADEMARK OFFICE
CERTIFICATE OF CORRECTION

PATENT NO. : 6,905,181 B2
APPLICATION NO. : 10/691439
DATED : June 14, 2005
INVENTOR(S) : Yoshihiro Iwagawa et al.

It is certified that error appears in the above-identified patent and that said Letters Patent is hereby corrected as shown below:

In the drawings:
   Fig. 10, in Step Box S15, change "WHHEEL" to --WHEEL--.
   Fig. 11, in Step Box S39, change "PPEDAL" to --PEDAL--.
   Fig. 26, in Step Box S251, change "OPETATION" to --OPERATION--.

Column 5:
   Line 60, change "FIGS. 3. to 5," to --FIGS. 3 to 5,--.

Column 7:
   Line 1, change "in step s306," to --in step S306,--.
   Line 5, change "in step s307," to --in step S307,--.
   Lines 24-25, change "a fail safe mode" to --a fail-safe mode--.
   Line 34, change "a fail safe mode" to --a fail-safe mode--.
   Line 39, change "a fail safe mode" to --a fail-safe mode--.
   Line 49-50, change "a fail safe mode" to --a fail-safe mode--.
   Line 54, change "a fail safe mode" to --a fail-safe mode--.

Column 8:
   Line 43, change "of the both inner cables" to --of both the inner cables--.

Column 9:
   Line 52, change "a fail safe" to --a fail-safe--.
   Line 61, change "in step 10," to --in step S10,--.

Column 11:
   Line 17, change "puling force" to --pulling force--.

Column 12:
   Line 48, change "pulling force Bft1" to --pulling force BfT1--.

Column 14:
   Line 8, change "in step s31," to --in step S31,--.
   Line 45, change " "D"of "R", " to --"D" or "R",--.

Column 16:
   Line 8, change "the step 58." to --the step S58.--.
   Line 11, change "in step 63" to --in step S63--.

Column 17:
   Line 40, change "in step 67," to --in step S67,--.

UNITED STATES PATENT AND TRADEMARK OFFICE
CERTIFICATE OF CORRECTION

PATENT NO. : 6,905,181 B2
APPLICATION NO. : 10/691439
DATED : June 14, 2005
INVENTOR(S) : Yoshihiro Iwagawa et al.

It is certified that error appears in the above-identified patent and that said Letters Patent is hereby corrected as shown below:

Column 18:
  Line 64, change "following equation;" to --following equation:--.

Column 19:
  Line 31, change "fail safe process" to --fail-safe process--.

Column 20:
  Line 5, change "in step 119," to --in step S119,--.
  Line 8, change "in the step s119," to --in the step S119,--.
  Line 11, change "a fail safe process" to --a fail-safe process--.
  Line 31, change "instep S131." to --in step S131.--.
  Line 59, change "in step 139," to --in step S139,--.

Column 21:
  Line 45, change "following equation;" to --following equation:--.
  Line 47, change "in step s158," to --in step S158,--.

Column 22:
  Line 9, change "a fail safe process" to --a fail-safe process--.
  Line 63, change "FLvw(n)" to --FLVw(n)--.
  Line 65, change "value the acceleration" to --value of the acceleration--.

Column 23:
  Line 34, change "in step 185," to --in step S185,--.
  Line 59, change "from an equation;" to --from an equation:--.

Column 24:
  Line 53, change "is stepped in step S204." to --is stopped in step S204.--.

Column 26:
  Line 27, change "following equation;" to --following equation:--.
  Line 29, change "in step 230," to --in step S230,--.
  Line 56, change "a fail safe process" to --a fail-safe process--.

Column 27:
  Line 29, change "a fail safe process" to --a fail-safe process--.
  Line 35, change "the fail safe process" to --the fail-safe process--.
  Line 67, change "position fat" to --position f at--.

UNITED STATES PATENT AND TRADEMARK OFFICE
CERTIFICATE OF CORRECTION

PATENT NO. : 6,905,181 B2
APPLICATION NO. : 10/691439
DATED : June 14, 2005
INVENTOR(S) : Yoshihiro Iwagawa et al.

It is certified that error appears in the above-identified patent and that said Letters Patent is hereby corrected as shown below:

Column 28:
    Line 14, change "at position I," to --at position i,--.

Column 29:
    Line 19, change "S195, s196" to --S195, S196--.
    Line 22, change "RrG$\geq$0.0 G" to --RrG>0.0G--.
    Line 59, change "to 0.15 g then" to --to 0.15G then--.

Column 30:
    Line 1, change "the step s193" to --the step S193--.
    Line 14, change "to (90% of" to --to 90% of--.
    Line 15, change "in the embodiment)" to --in the embodiment,--.
    Line 29, change "RrG$\geq$0.0G" to --RrG>0.0G--.
    Line 37, change "RrG0.0 G$\geq$0.0 G," to --RrG$\geq$0.0G$\geq$0.0,--.

Column 32:
    Line 1, change "forth aspect" to --fourth aspect--.

Signed and Sealed this

Twenty-sixth Day of September, 2006

JON W. DUDAS
*Director of the United States Patent and Trademark Office*